United States Patent
Cornwell et al.

(10) Patent No.: US 9,676,630 B2
(45) Date of Patent: Jun. 13, 2017

(54) HIGH STRENGTH CARBON NANOTUBE PLASMA-TREATED FIBERS AND METHODS OF MAKING

(71) Applicants: Charles F. Cornwell, Vicksburg, MS (US); Charles P. Marsh, Urbana, IL (US); Charles R. Welch, Vicksburg, MS (US); Benjamin Ulmen, Urbana, IL (US); Dustin L. Majure, Madison, MS (US)

(72) Inventors: Charles F. Cornwell, Vicksburg, MS (US); Charles P. Marsh, Urbana, IL (US); Charles R. Welch, Vicksburg, MS (US); Benjamin Ulmen, Urbana, IL (US); Dustin L. Majure, Madison, MS (US)

(73) Assignee: THE UNITED STATES OF AMERICA AS REPRESENTED BY THE SECRETARY OF THE ARMY, Washington, DC (US)

(*) Notice: Subject to any disclaimer, the term of this patent is extended or adjusted under 35 U.S.C. 154(b) by 300 days.

(21) Appl. No.: 13/903,979

(22) Filed: May 28, 2013

(65) Prior Publication Data
US 2016/0200577 A1 Jul. 14, 2016

Related U.S. Application Data

(60) Provisional application No. 61/651,853, filed on May 25, 2012.

(51) Int. Cl.
*C01B 31/02* (2006.01)

(52) U.S. Cl.
CPC ................... *C01B 31/0253* (2013.01)

(58) Field of Classification Search
CPC .............. C01B 31/0253; C01B 31/022; C01B 31/0226; C01B 31/0233; C01B 31/024; C01B 31/0246; C01B 31/026; C01B 31/0266; C01B 31/0273; C01B 31/028; C01B 31/0286; C01B 31/0293; C01B 2202/00; C01B 2202/02
USPC ........ 423/447.1–447.3, 445 B; 977/742–754, 977/842–848
See application file for complete search history.

(56) References Cited

U.S. PATENT DOCUMENTS

2008/0170982 A1* 7/2008 Zhang ................... B82Y 10/00
                                                              423/447.3

* cited by examiner

*Primary Examiner* — Daniel C McCracken
(74) *Attorney, Agent, or Firm* — Brian C Jones

(57) ABSTRACT

Carbon nanotubes have excellent mechanical properties such as low density, high stiffness, and exceptional strength making them ideal candidates for reinforcement material in a wide range of high-performance composites. Fibers with increased tensile strengths are produced by employing plasma treatment under various conditions. Tensile strength is improved by at least 35%, relative to an untreated fiber. Methods of making such high strength carbon nanotube fibers via plasma processing are disclosed.

12 Claims, 27 Drawing Sheets

HIGH STRENGTH CARBON NANOTUBE PLASMA-TREATED FIBERS AND METHODS OF MAKING

FIELD OF THE INVENTION

The mechanical properties of carbon nanotubes such as low density, high stiffness, and exceptional strength make them ideal candidates for reinforcement material, in a wide range of high-performance composites. Molecular dynamics simulations predict the tensile response of fibers composed of aligned carbon nanotubes with intermolecular bonds of interstitial carbon atoms. The interstitial carbon bonds significantly increase load transfer between the carbon nanotubes over that obtained with van der Waals forces. Fibers with increased tensile strengths are produced by employing plasma treatment under various conditions. Tensile strength is improved by at least 35%, relative to an untreated fiber.

BACKGROUND OF THE INVENTION

Several groups and individuals are credited with the independent discovery of carbon nanotubes. The most influential papers identifying the basic structure of carbon nanotubes are arguably the paper by Iijima (1991) for multiwall carbon nanotubes, and the 1993 papers by Iijima and Ichihashi (1993) and by Bethune et al. (1993), which describe single-wall carbon nanotubes. A detailed discussion of the discoverers of carbon nanotubes can be found in Monthioux and Kuznetsov (2006).

Since Iijima's 1991 paper, carbon nanotubes have been the subject of intense theoretical and technological interest in materials science because of their extreme characteristics. Their theoretically-predicted and experimentally-measured mechanical properties, including high strength, high stiffness, toughness, and low density, should make them ideal strengthening material in advanced fiber-reinforced composites, woven fabrics, and textiles with potential applications in aeronautics, automotive systems, armor, and civil engineering. Both theoretical and experimental studies have shown that the elastic modulus of a carbon nanotube is in the range of 1-2 TPa (Krishnan et al., 1998). Treacy et al. (1996) measured the Young's modulus of isolated nanotubes by measuring the amplitude of their intrinsic thermal vibrations using transmission electron microscopy, and found the average value of Young's modulus to be 1.8 TPa. Haskins et al. (2007) used Tight-Binding Molecular Dynamics simulations to examine the effects of defects on carbon nanotubes, and deduced values of Young's modulus and tensile strengths for (5,5) chiral carbon nanotubes of between 0.95 to 1.15 TPa and 70 to 110 GPa, respectively, for the molecular detects considered. Dresselhaus et al. (2008) provide a fairly recent and comprehensive summary of the research results of the properties of carbon nanotubes.

Carbon nanotubes are produced in primarily two configurations; single-walled carbon nanotubes (SWNT) and multi-walled carbon nanotubes (MWNT), and can be twisted or woven into carbon nanotube fibers. Parallel-aligned carbon nanotube fibers form hexagonal closest packed fibers because of the van der Waals forces of attraction between the individual carbon nanotubes. While the strength and stiffness of carbon nanotubes are extremely high, to date fibers of aligned carbon nanotubes have been found to be far weaker than the constituent carbon nanotubes (e.g., Qian et al., 2003; Ericson et al., 2004; Koziol et al., 2007; and Zhang et al., 2008). There is evidence that slippage between overlapping carbon nanotubes occurs in parallel aligned carbon nanotube fibers and MWNTs under strain and that the slippage occurs at tensions well below the breaking strength of the carbon nanotubes (Walters et al., 1909; Yu et al., 2000a, 2000b; Qian et al., 2003). There are several estimates in the literature for the carbon nanotube contact length required to produce a frictional force equal to the breaking strength of the carbon nanotubes. Qian et al. (2002) estimate that the carbon nanotube contact length required to achieve the load transfer needed to reach the intrinsic carbon nanotube breaking strength could be on the order of 10-120 µm. Yakobson et al. (2000) estimated that the CNT contact length needed for fibers to approach a full strength of carbon nanotubes was on the order of 10 µm. Twisting and stretching the individual strands into a fiber has been demonstrated to increase the load transfer between the carbon nanotubes and result in higher elastic modulus and strength Walters et al., 1999; Qian et al., 2003; Liu and Qin, 2005, Zhang et al., 2004; Zhang et al., 2007; Koziol et al., 2007; Kleis et al., 2008; Zhang and Li, 2009). However, the tensile strength of the twisted fibers is still considerably less than the tensile strength of the constituent carbon nanotubes.

Simulations of neat fibers of aligned carbon nanotubes were performed to determine the stress-strain characteristics of parallel-aligned carbon nanotube fibers. The simulations were carried out using Sandia Laboratory's Large-scale Atomic/Molecular Massively Parallel Simulator (LAMMPS) code (Plimpton, 1995). The potential energy of the system was calculated using the Adaptive Intermolecular Reactive Empirical Bond Order (AIREBO) Potential (Stuart et al., 2000). Tersoff type potentials such as AIREBO are reactive meaning they allow bonds to form and break during the course of a simulation. They have been shown to be qualitatively good at modeling the mechanical properties of carbon-based materials (Yakobson et al., 1996; Yakobson et al., 1997; Cornwell and Wille, 1997; Garg et al., 1998). The computational cost of reactive potentials is relatively high compared to non-reactive potentials. Simulating large ensembles of carbon nanotubes containing millions of atoms requires high performance computer (HPC) and computer algorithms that scale efficiently on thousands of processors LAMMPS is specifically designed to run on parallel computer systems and has good scaling characteristics on a wide range of HPC platforms (Sandia National laboratories, no date). The calculations were performed on the Cray XT3 (Jade) at the DoD Supercomputing Resource Center (DSRC) located at the U.S. Army Engineer Research and Development Center, Vicksburg, Miss.

Initial simulations (Cornwell et al., 2009) indicate that the factor limiting the strength of the parallel-aligned carbon nanotube fibers is the poor load transfer between the carbon nanotubes. To overcome this limitation, covalent interstitial carbon atoms (that is, a carbon atom inserted between the strands of the fiber) were introduced. The interstitial carbon atoms form chemical bonds between the strands of the fibers to facilitate load transfer between the carbon nanotubes and thus prevent slipping. Such chemical bonds have been observed experimentally by several groups (e.g., Kis et al., 2004; Krasheninnikov et al., 2003; Sammalkorpi et al., 2005; Pregler and Sinnott, 2006; Peng et al., 2008) and were created as a result of irradiation of carbon nanotubes with high-energy particles.

SUMMARY OF THE INVENTION

It is an object of the invention to produce carbon nanotube (CNT) fibers with increased tensile strengths by employing plasma treatment under various conditions, including inert carrier gases, carrier gases having a carbon source, and pressurized carrier gases. The objects of the invention are achieved, and tensile strength is improved by at least 35%, relative to an untreated fiber.

DETAILED DESCRIPTION OF THE INVENTION

Simulated Fiber Construction and Computational Details—The exceptional mechanical properties of individual carbon nanotubes are interesting and important due to potential structural applications. In many respects, carbon nanotubes can be considered engineering structures and main properties can be discussed in traditional terms of moduli, stiffness, and geometric size and shape. In most applications, the ultimate strength of carbon nanotube-based materials is limited by the weak lateral interaction between carbon nanotubes and/or the weak interaction between carbon nanotubes and matrix materials. The ultimate strength of carbon nanotube-based materials is inherently a mesoscopic phenomenon, such as plasticity and fracture on a microscopic and atomistic level. The poor load transfer between carbon nanotubes can limit the mechanical strength, and moduli of carbon nanotube fibers.

Figure 1A:
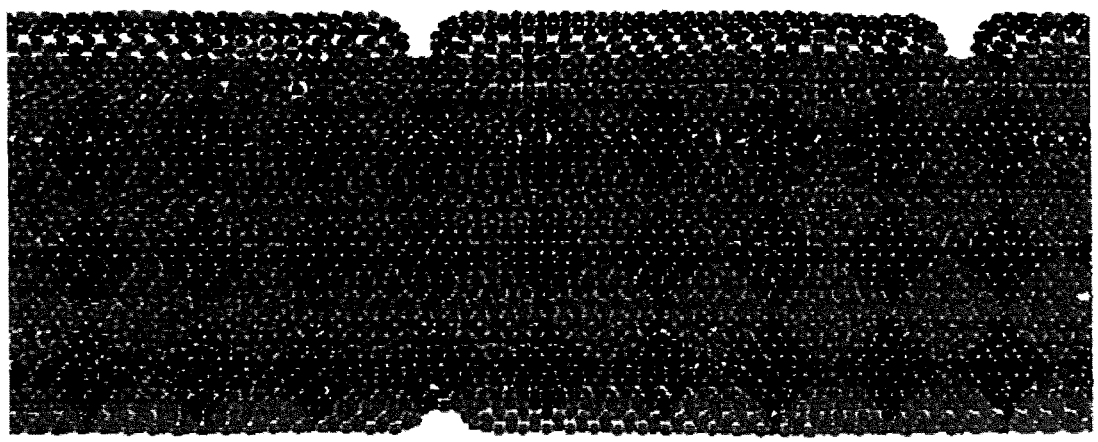
FIG. 1(A) depicts simulation carbon nanotube fiber with interstitial carbon atoms forming cross-linking bonds along the length of the fiber.
Figure 1B:
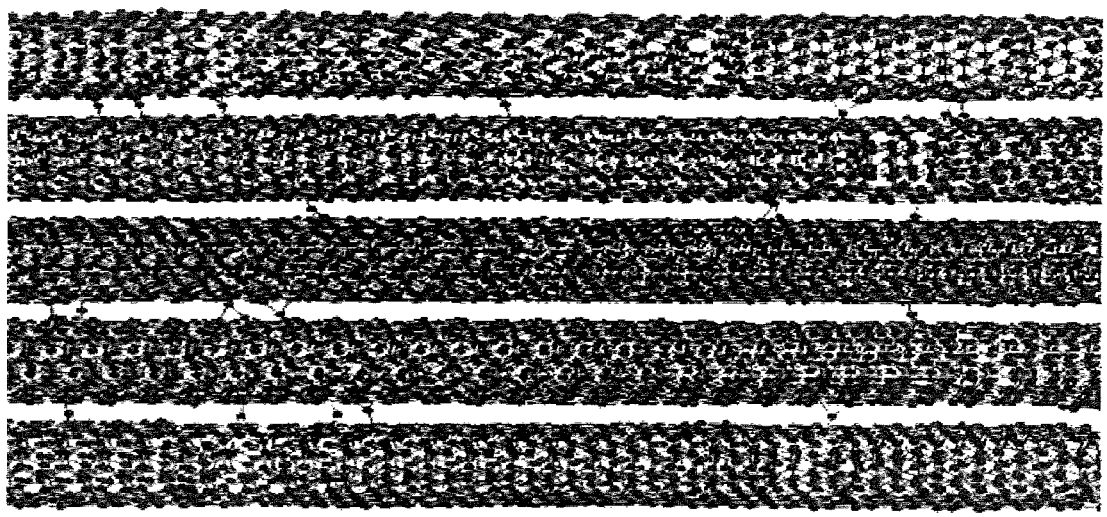
FIG. 1(B) depicts simulation HCP array of parallel aligned carbon nanotubes.

The digital representations of the fibers were constructed with the carbon nanotubes aligned parallel to the carbon nanotube axis which is the x-axis in the simulations. Experimental results indicate that carbon nanotubes within a fiber have similar radii and are randomly distributed; i.e., there is no correlation between the z-coordinates of the different tubes, and they most probably have random azimuthal orientations (Thess et al., 1996). The digital representations of the fibers were constructed using a random distribution of carbon nanotube lengths, with each carbon nanotube given a random rotation about its longitudinal axis between 0 and $2\pi$. FIG. 1(B) shows the initial fiber configuration.

Figure 1C:
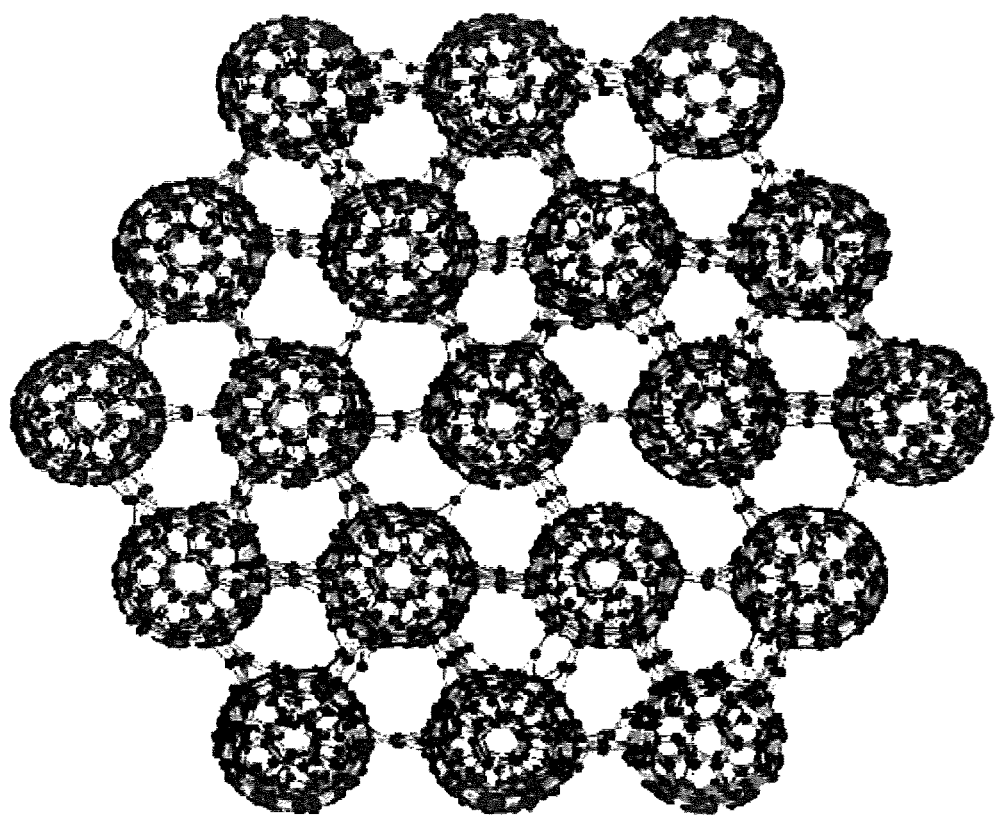
FIG. 1(C) depicts simulation cross section of fiber with cross-links between the strands of the fiber.

The longitudinal axes of the fibers were initially centered on the z-axis. The strands consisted, of parallel (5,5) carbon nanotubes placed end-to-end arranged parallel to one another (FIG. 1(B)). Each fiber had 19 strands arranged in a hexagonal closest packed (HCP) configuration (FIG. 1(C)) with a gap between carbon nanotubes in the strands equal to 3.33 Å.

The simulations had periodic boundary conditions in the three Cartesian dimensions. The system size in the x-y plane was large enough to prevent any interaction across the boundary for atoms in the fiber. A Berendsen thermostat was applied to all the atoms to minimize the heat conduction problem pointed out in Berendsen et al. (1984) and Mylvaganam and Zhang (2004). The lengths of the fibers ranged from 2000 Å to 8000 Å and were constructed using carbon nanotubes with the average length selected from a Gaussian distribution. In each case, the average length of the carbon nanotubes was 0.25 times the length of the fiber, and the standard deviation of the carbon nanotube lengths was 0.2 times the average carbon nanotube length. To avoid extremely short or long carbon nanotubes, the range of acceptable lengths was restricted to the average carbon nanotube length plus or minus the full width at half maximum of the Gaussian distribution function. In particular, it was desired that none of the carbon nanotubes spanned the entire length of the fiber.

The position for a test atom is randomly selected from the volume of the fiber and used to produce the cross-link atoms. A check is made to determine if the test atom forms the correct number of nearest neighbor bonds and that it forms bonds between CNTs from two different strands. If it does not meet this criterion, it is rejected. The process is repeated until the fiber contains the desired concentration of cross-link atoms. The concentration of cross-link atoms is defined as the number of cross-link atoms divided by the number of atoms in the fiber expressed as a percentage. The initial percentage of cross-link atoms for each fiber length was 0.125, 0.250, 0.500, and 0.750 percent. Then, the strain energy is calculated for the cross-link atoms. If the strain energy is too high, the cross-link atom is removed. Therefore, the actual percentage of cross-links was always slightly lower than the initial percentage because of the method used to create the digital fiber models. Similarly, the actual starting length of the fibers was slightly less than the initial length because the fibers contract during the quenching process at the start of the simulation. This section of the simulation allowed the fibers to acquire their length at zero stress before any strain was applied to the fiber. In the following, the initial length of the fiber and the initial percentage of cross-link atoms are used to distinguish between the different simulations.

The equilibrium distance between, the CNTs due to the van der Waals forces is greater than the separation distance for the C—C bonds in the cross-link atoms. Therefore, it is energetically favorable for cross-links to form around, the lines centered between the strands of the fiber. Tins produces the non-uniform distribution of cross-links in the x-v plane shown in FIG. 1(C). The software attempts to produce a uniform distribution of cross-link atoms along the length of the fiber. There will, of course, always be statistical variations between the different fibers (FIG. 1(A)). The cross-link bonds also pull the strands in the fiber closer together and further increase load transfer by increasing the steric resistance to CNT sliding.

The simulations calculated the changing forces between carbon atoms as the carbon nanotube molecules were distorted to derive stress-strain relations. Newton's equations of motion were numerically integrated over time using the Velocity-Verlet Integrator with a time-step of 1.0 femtosecond The simulations were run at a temperature of 300 K. The stress tensor was calculated using:

$$\langle S_{ij} \rangle = \frac{\sum_{k}^{N} m_k v_{k_i} v_{k_j}}{V} + \frac{\sum_{k}^{N} r_{k_i} f_{k_j}}{V} \quad (1)$$

The first term of Eq. 1 is the kinetic energy tensor, and the second term is the virial stress tensor. N is the number of atoms in the system and the Cartesian coordinates are designated by i and j=x, y, z. The variables $m_k$, $v_k$, $r_k$, and $f_k$ are the mass, velocity, position, and force for atom k respectively, and V is the volume of the fiber. Here, the volume of the fiber is calculated using the length of the fiber times its cross section. There is some ambiguity when measuring the dimensions of an atomic system. The calculations presented here used the area of a regular hexagon that encloses the strands of the fiber to define the fiber's cross-sectional area. The side length l of a regular hexagon that splits the distance between two HCP rings was used to calculate the area of the hexagon. The side length l is given by:

$$l=(2n+1)(2r+d)/2=25.75 \text{ Å} \quad (2)$$

where n is the number of HCP layers (2), r is the radius of the carbon nanotube (3.49 Å), and d is the separation distance between the carbon nanotubes (3.33 Å). The cross sections were the same for all of the fibers and were considered constant over the course of the simulation.

Time-independent material constitutive properties are derived from static or slow tension conditions. MD simulation using classical potentials operate on short time scales with the simulation times limited to picoseconds up to nanoseconds. While this is orders of magnitude greater than the periods of intramolecular vibrations or intermolecular collision, it is still much less than a normal test-time for a "molecular tension test." Hence, MD simulations produce unrealistically high strain rates. In an attempt to mitigate the effects of the high strain rates, the strain was Increased in small increments over short periods and allowed to equilibrate between strain increments. Nevertheless, MD simulation addresses the "molecular strength" of the nano-structure materials and should be considered the upper limit one can expect to achieve in an engineering application.

Figure 2:
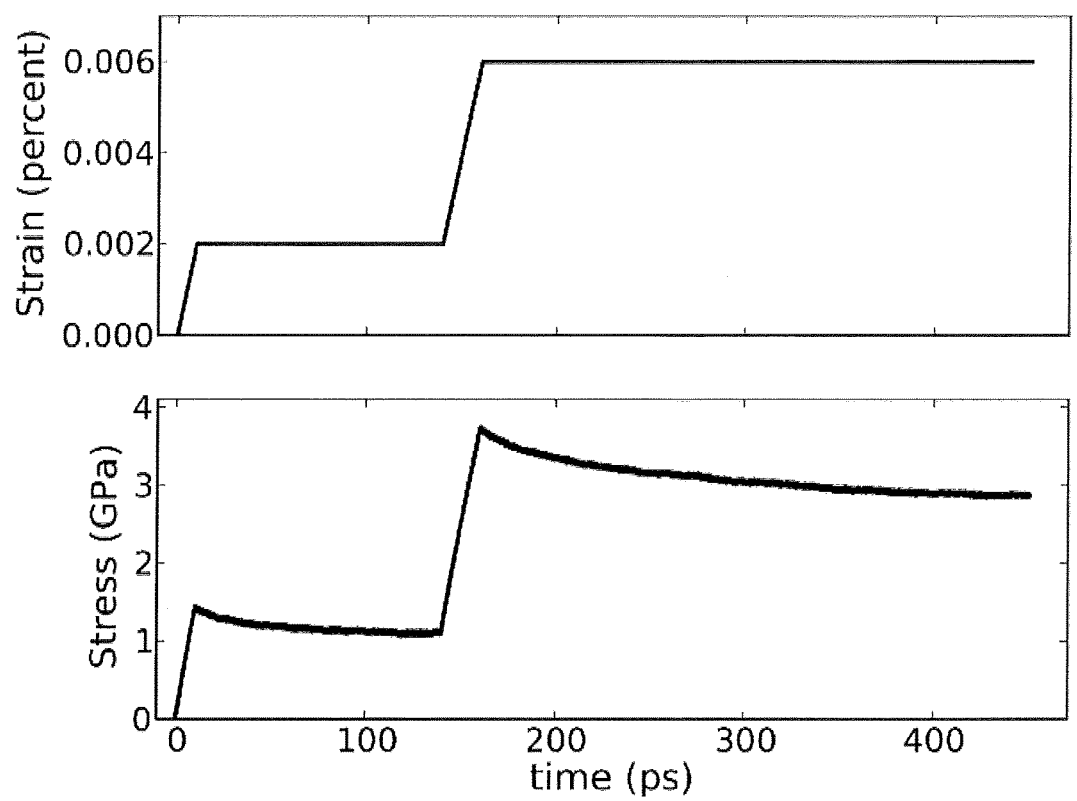
FIG. 2 depicts simulation time evolution of the stress and strain for two increments of increased strain.

Strain was applied to the fibers by increasing the length of the fiber in small increments and allowing the stress to equilibrate between strain increments. The length of the fiber was increased in steps by scaling the positions of the atoms an amount that varied along the longitudinal axis of the fiber depending on the coordinate of the atoms. The stress was then allowed to approach equilibrium after each strain increment. FIG. 2 shows the time evolution of the stress and strain for two strain increments. At time t=0 picoseconds (ps) the strain was increased at a rate of $2.0E8(s^{-1})$ for 10 ps increasing the strain by 0.002 (fraction). At i=1.50 ps the strain was increased at a rate of $2.0E8(s^{-1})$ for 20 ps increasing the strain by 0.004 (fraction). In both cases, the strain was held constant for a period after each increase in strain to allow the stress to equilibrate. The stress tensor was calculated by averaging Eq. 1 over 20 ps. If the difference in the stress between two consecutive stress calculations was below a given threshold, the stress was considered at equilibrium and the process continued. This provided a feedback loop that effectively resulted in a variable strain rate, based on simulation conditions, that gave the fiber time to respond to bond breaking, defect formation and migration, slipping or failure of the carbon nanotubes and the resulting structural changes that took place in the fiber from these processes.

Figure 3:
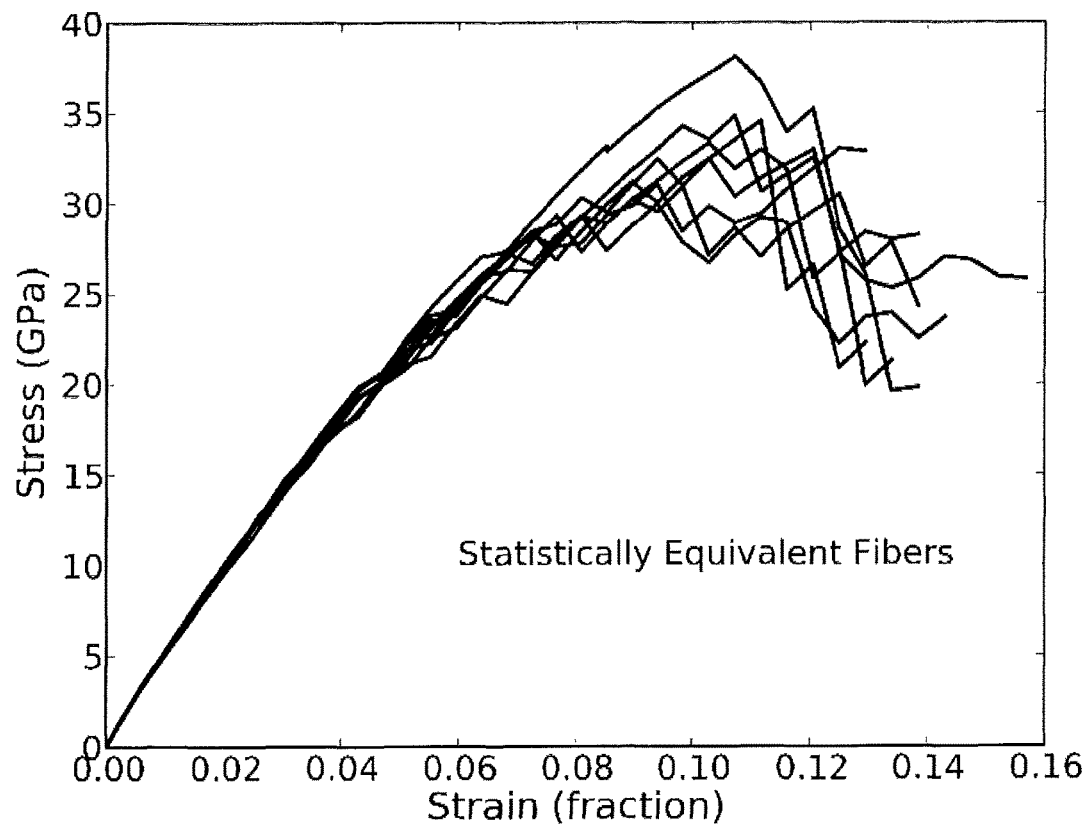
FIG. 3 depicts simulation stress-strain curves for eight statistically equivalent fibers. A different seed is used for the random number generator to construct the fiber. All of the fibers are 4000 Å long and constructed using carbon nanotubes with an average length of 1000 Å having a standard deviation in the tube length of 200 Å.

Results of Computer Modeling and Simulation—Because the fibers were constructed using carbon nanotubes with random orientations, random distribution of lengths, and a random distribution of cross-link atoms, one would expect variations in the mechanical properties of the fibers due to the random method of fiber construction. A plot of the stress-strain curves for eight statistically equivalent fibers is shown in FIG. 3. The fibers were 4000 Å long and were constructed using carbon nanotubes with an average length of 1000 Å. The standard deviation in the tube length was 200 Å and they all had a cross-link concentration of about 0.225 percent. In Table 1 the calculated results for the maximum stress, strain at maximum stress, initial elastic modulus, and concentration of cross-links as well as the average and standard deviation in these values are presented in FIG. 3. The average maximum stress for the eight simulations is 33.467 GPa with a standard deviation of 2.495 GPa. This represents a standard deviation of 7.46 percent of the average maximum stress. The eight simulations had an average initial elastic modulus of 586.434 GPa with a standard deviation of 14.743 GPa representing a standard deviation of 2.51 percent of the average initial modulus. While there are some variations in the stress-strain curves in FIG. 3, the simulations produce consistent and reproducible results for statistically equivalent fibers. This indicates the method for calculating the stress-strain curves and the carbon nanotube ensembles used to construct the fibers were generally large enough to average out the statistical variations in the mechanical properties due to the random fiber construction process. Trends m fiber properties can be determined, because the statistical variations in the fiber properties were small compared to the effects due to variations in carbon nanotube length and cross-link distribution. To minimize the effects of statistical variations, the same seed for the random number generator was used to construct all of the remaining fibers.

TABLE 1

Simulation results for eight statistically equivalent fibers. The fibers are 4000 Å long and the carbon nanotubes have an average length of 1000 Å with a standard deviation of 200 Å. The average concentration of cross-links is 0.225 percent.

| Stress-strain results for eight statistically equivalent fibers | Modulus (Gpa) | Max Stress (Gpa) | Strain at max Stress (fractlon) | Cross-link concentration (percent) |
|---|---|---|---|---|
| Run No. 1 | 595.964 | 34.835 | 0.107 | 0.225316 |
| Run No. 2 | 603.408 | 30.938 | 0.098 | 0.225307 |
| Run No. 3 | 574.675 | 33.038 | 0.125 | 0.225295 |
| Run No. 4 | 594.217 | 38.112 | 0.107 | 0.225301 |
| Run No. 5 | 581.259 | 32.981 | 0.121 | 0.225283 |
| Run No. 6 | 561.106 | 29.983 | 0.094 | 0.225296 |
| Run No. 7 | 579.383 | 33.312 | 0.103 | 0.225301 |
| Run No. 8 | 601.458 | 34.538 | 0.112 | 0.225312 |
| Min | 561.106 | 29.983 | 0.094 | 0.225283 |
| Max | 603.408 | 38.112 | 0.125 | 0.225316 |
| Average | 586.434 | 33.467 | 0.108 | 0.225301 |
| Standard deviation | 14.743 | 2.495 | 0.011 | 1.046E−05 |

Figure 4:
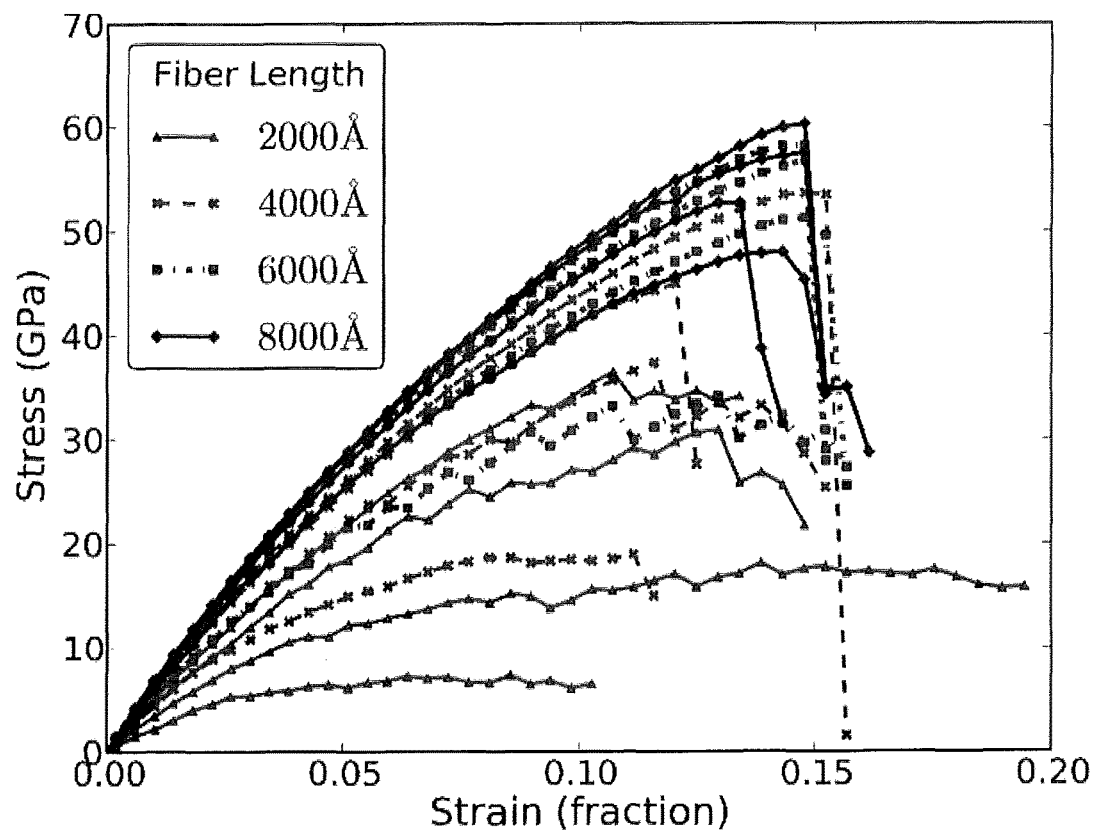
FIG. 4 depicts simulation stress-strain curve results for fiber lengths 2000, 4000, 6000, and 8000 Å long with initial cross-link concentrations of 0.125, 0.250, 0.500, and 0.750. The plots of lower to higher cross-link concentrations run from lower to higher stress for each of the fiber length considered.

A series of simulations were run to investigate the effect of carbon nanotube length and cross-link distribution on the tensile response of parallel-aligned carbon nanotube fibers. FIG. 4 shows the tensile stress-strain plots for fibers with initial lengths of 2000, 4000, 6000, and 8000 Å. In each case, the initial fiber length was 4 times the average carbon nanotube length and the standard deviation in the carbon nanotube length was 0.2 times the average carbon nanotube length. The maximum stress for each fiber length increased with an increase in the concentration of cross-link atoms. From the results of the stress-strain calculations presented in FIG. 4, the overall trends of the elastic modulus, tensile strength, and critical strain, that is failure strain, for fibers of different lengths and concentrations of cross-links are visible. The elastic modulus was calculated over the linear portion of the stress-strain curves, hence is an initial or tangent modulus. The point of maximum stress was used to determine the tensile strength of the fibers. The critical strains ranged from 0.085 for the 2000 Å fiber with an initial cross-link concentration of 0.125 percent, to a critical strain of 0.148 for the 6000 Å fiber with an initial cross-link percentage of 0.500. The maximum tensile strength and elastic modulus of 62.3 and 721.2 GPa respectively was calculated for the 8000 Å long fiber with a percentage of cross-links of 0.750. The tensile strength of the (5,5) carbon nanotubes used to construct the fibers is 110 Gpa (Haskins et al., 2007). The calculations presented here indicate that the load transfer provided by the cross-link atoms allows the fiber to retain a substantial portion of the strength of the constituent carbon nanotubes in the fiber. The elastic modulus, tensile strength, and critical strain increased with increasing carbon nanotube length and cross-link concentration, with both the elastic modulus and tensile strength approaching an asymptotic limit. The trends in the elastic modulus and fiber strength for each fiber length are also apparent when calculated for the different cross-link concentrations.

Figure 5:
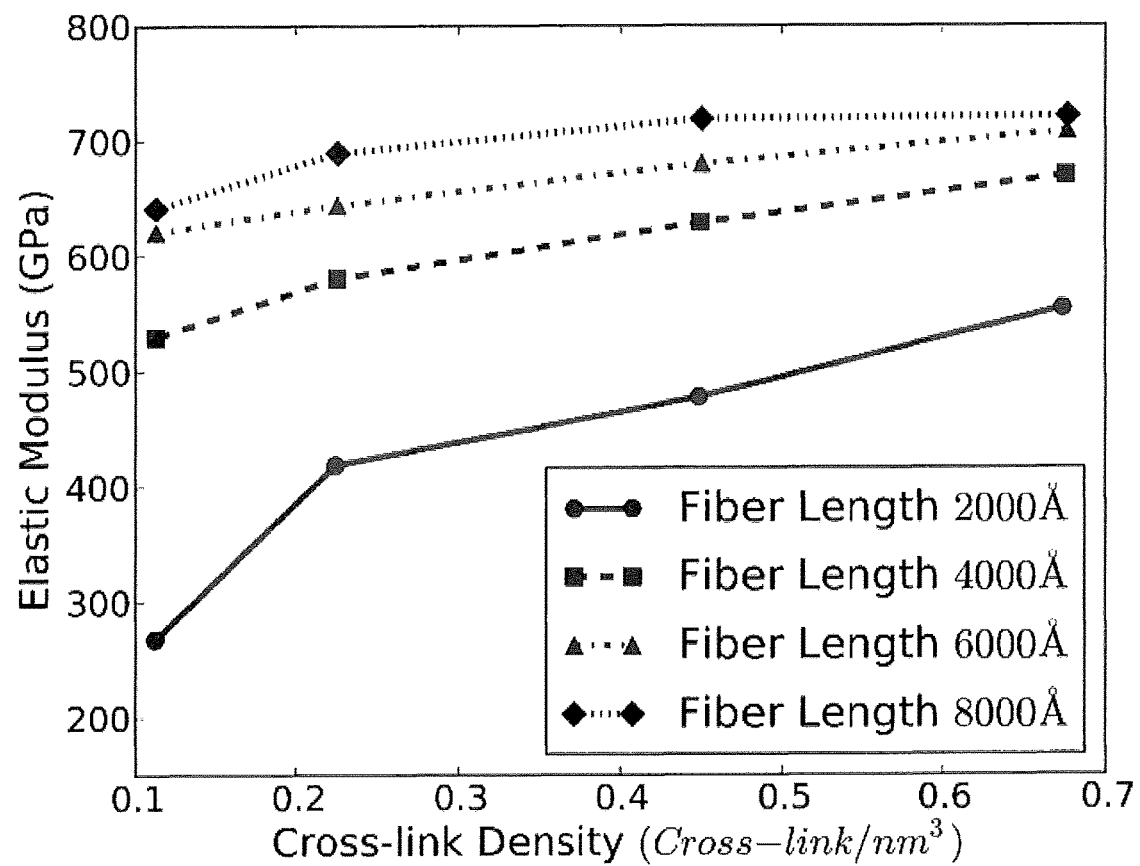
FIG. 5 depicts simulation elastic modulus for fibers 2000, 4000, 6000, and 8000 Å long with different concentrations of cross-links.

The plots in FIG. 5 reveal how the Young's modulus scales with cross-link concentration. The modulus increased with the concentration of cross-links for all fiber lengths. For the shortest fiber (2000 Å), the modulus increased from 267.9 GPa to 554.3 GPa, or over a factor of 2, as the concentration of cross-links increased from 0.112 to 0.674 percent. The elastic modulus for the longer fiber was less sensitive to cross-link concentrations over the same range of cross-link concentrations. The elastic modulus for the longest fiber (8000 Å) increases from 641.62 to 721.24 GPa, or 12 percent, as the concentration of cross-links increased from 0.113 to 0.677 percent. Hence, the rate of increase in the elastic modulus decreased with fiber length for all cross-link concentrations indicating an upper limit in the elastic modulus for all fiber lengths. The results also slum that it is possible to achieve a higher elastic modulus with lower concentrations of cross-links for fibers constructed from carbon nanotubes with a longer average length.

Figure 6:
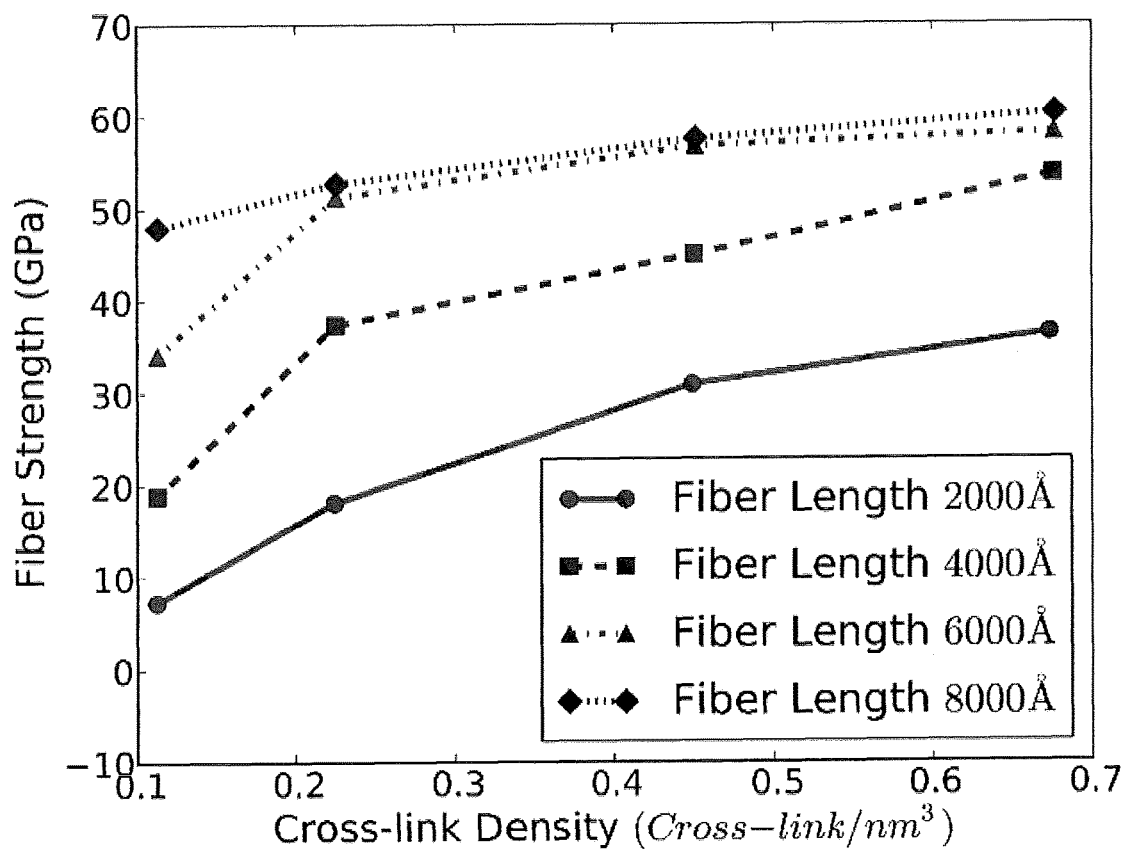
FIG. 6 depicts simulation fiber strength for fiber lengths of 2000, 4000, 6000, and 8000 Å with increasing cross-link concentrations.
Figure 10:
FIG. 10 depicts simulation rupture of carbon nanotubes in the longer fibers with higher concentrations of cross-links.
Figure 11:
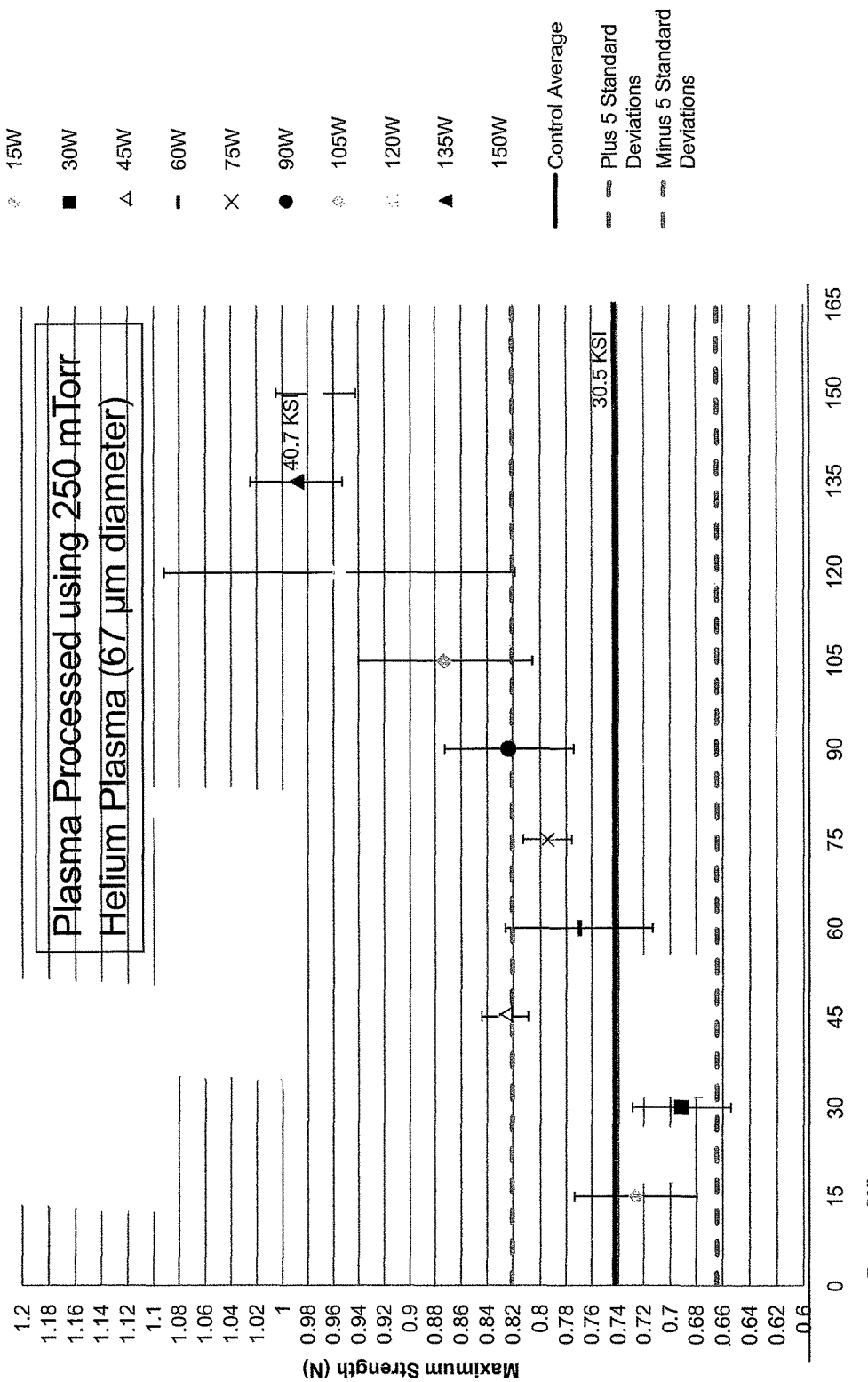
FIG. 11 shows experimental data for maximum fiber strength as a function of power, 3 minutes, 5 trials.

FIG. 6 shows the variations in the fiber tensile strength for the different fiber lengths, hence carbon nanotube lengths, with increased cross-link concentration. As with the elastic modulus, the rate of increase in fiber strength decreased with fiber length for all cross-link concentrations, while for a given crosslink concentration the absolute tensile strength increased with length. FIG. 6 also shows that increasing the average carbon nanotube length lowers the cross-link concentration required to reach the maximum strength of the fibers. Visual inspection of the simulations shows that for the shorter fibers and lower concentrations of cross-links, the fibers fail at the cross-links. For the longer fibers and higher concentrations of cross-links, the fibers fail because the carbon nanotubes fail as shown in FIG. 10. A similar phenomenon was reported in Pregler and Sinnott (2006) for simulations of cross-linking between MWNT.

Figure 7:
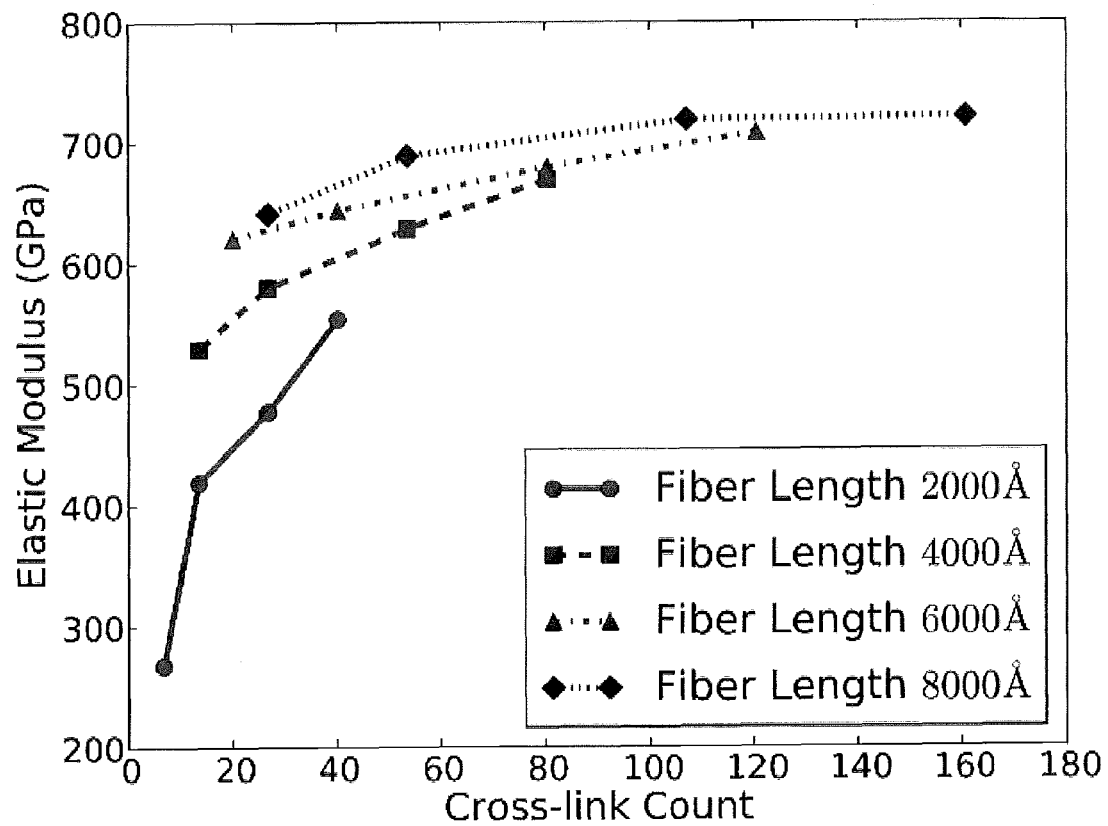
FIG. 7 depicts simulation elastic modulus for fibers 2000, 4000, 6000, and 8000 Å long versus approximate average number of cross-links of the core carbon nanotubes.
Figure 8:
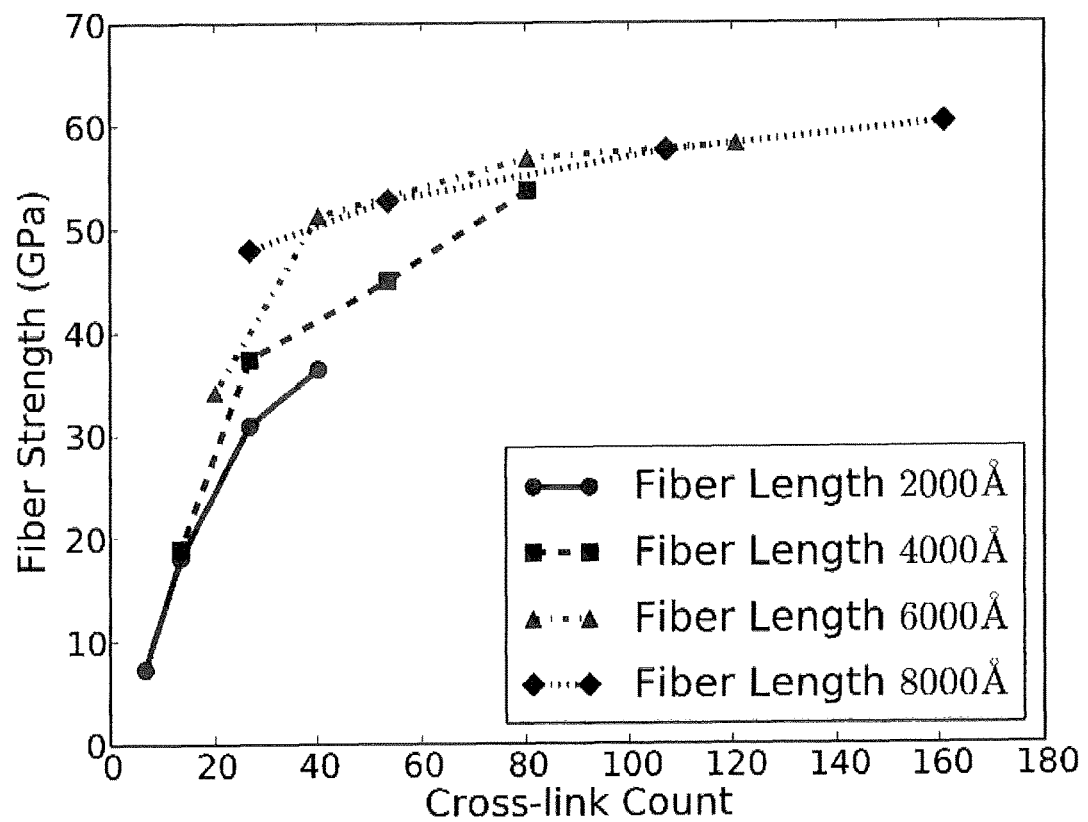
FIG. 8 depicts simulation fiber strength for fibers 2000, 4000, 6000, and 8000 Å long versus approximate average number of cross-links of the core carbon nanotubes.

A better understanding of the effect of interstitial carbon atom cross-linking on the properties of carbon nanotube fibers can be had by considering the average number of cross-links per carbon nanotube. The average number of cross-links for a carbon nanotube in a fiber is equal to the length of the carbon nanotube times the number of neighboring strands times the linear density of cross-links. FIGS. 7 and 8 show the elastic modulus and fiber strength as a function of the average number of cross-links for the core carbon nanotubes in the fibers.

For this range of parameters, FIGS. 7 and 8 indicate that the elastic modulus and fiber strength of the shorter fibers depend on both the average length of the constituent carbon nanotubes and the average number of cross-links per carbon nanotube. The dependence of the mechanical properties of the fiber on the average carbon nanotube length is largest for short fibers with low cross-link counts. For fibers with higher cross-link counts the elastic modulus and fiber strength depend on the cross-link count and are far less dependent on the average length of the constituent carbon nanotubes. In FIG. 8, fibers 4000, 6000, and 8000 Å long with a cross-link count of 80 have strengths that range from 53.7 GPa to 56.8 GPa. Both the elastic modulus and fiber strength approach an asymptotic limit with an increase in cross-link counts. The results also indicate that it is possible to reach the maximum values for both the elastic modulus and fiber strength with lower cross-link counts for fibers constructed with longer carbon nanotubes. It may also reflect the fact that to have the same number of cross-links for the shorter carbon nanotubes requires there to be cross-links closer to each other in the nanotubes. This may weaken the carbon nanotubes as the bonding structure goes from a 3-coordinated carbon-carbon bond to a 4-coordinated carbon-carbon bond.

Figure 9:
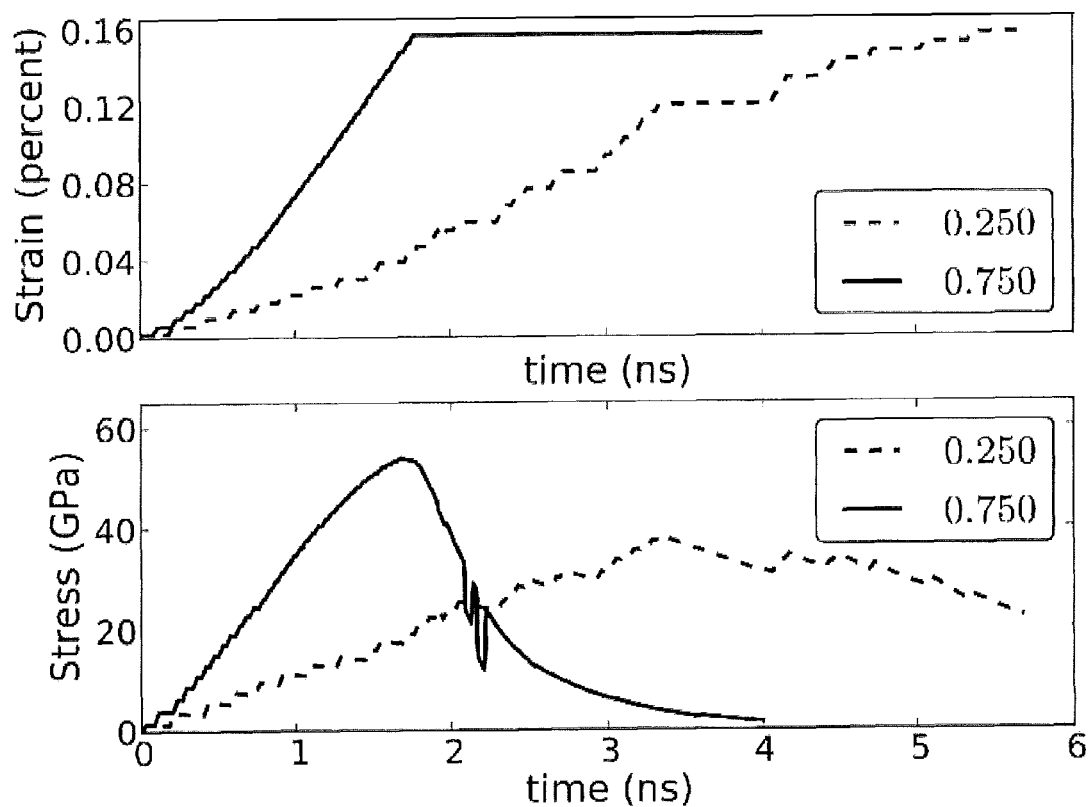
FIG. 9 depicts simulation time evolution of the stress and strain for a 4000 Å fiber. The average length of the carbon nanotubes in the fiber is 1000 Å having a standard deviation of 200 Å. The initial percentages of cross-links in the fibers are 0.25 and 0.75.

Although the simulations were not designed to analyze the post yield behavior of fibers. FIG. 4 suggests there is a transition from ductile to brittle behavior going from fibers constructed from the shorter carbon nanotubes and low cross-link counts to fibers constructed from longer carbon nanotubes and higher cross-link counts, that is, as the number of cross-links per carbon nanotube Increased. The results in FIG. 9 show the time evolution of the stress and strain for two 4000 Å fibers. The average length and standard deviation of the carbon nanotubes in both fibers are 1000 Å and 200 Å respectively. The number of cross-links per nanotube in the two fibers differs. The initial percentage of cross-links is 0.230 and 0.750 or an average of 26.8 and 80.4 cross-links for each core nanotube respectively. The plot of the stress and strain data in FIG. 9 is the time-average of the stress and strain at 10 ps intervals. In FIG. 9 the fiber with 0.750 percent cross-link concentration reaches a maximum stress of 33.99 GPa at a strain of 0.148 in 1.68 ns. At 1.77 ns and a strain of 0.157, the fiber begins to fail. At that point, the average strain holds constant and the stress decreases until the fiber breaks. Recall that displacement boundary conditions were used in the simulations and while the average strain in the fiber is holding constant, inside the fiber bonds are failing and the average internal stress is decreasing. The fiber stress never stabilizes once the fiber exceeds a strain of 0.177. In a macroscopic analogy, this is brittle failure. On the other hand, plot 0.250 in FIG. 9 reaches a maximum stress of 38.42 GPa at a strain of 0.121 in 3.35 ns. At that point, the fiber begins to fail and the strain. Is held constant for 0.71 ns before the fiber stress stabilizes. The stress continues to decrease with increasing strain but the fiber does not break and is able to support stress up to a strain of 0.157 where the simulation is terminated. In a macroscopic analogy, this is equivalent to ductile behavior. A detailed understanding of the molecular response of the fiber post-yield response is required to optimize the properties of fibers and to prevent brittle behavior.

FIG. 10 captures the simulation results as a fiber is beginning to rupture. Seen in the figure are multiple free carbon atoms that were released from the fiber matrix as the fiber broke. These atoms generally flew from the fiber with significant velocity as the potential energy from the fiber strain was released by the breaking fiber. The simulations indicate that failure begins when the fiber responds to bond breaking, defect formation, and slipping or failure of the carbon nanotubes. This results in a release of stress and structural changes in the fiber. If the resulting structure of the fiber is able to support the residual stress, the stress stabilizes. Otherwise, the fiber will fail again and the process is repeated until the stress stabilizes or the fiber breaks. Generally, the fibers with shorter CNTs and lower concentrations of cross-links, fail at the cross-links. Apparently, failure of a cross-link bond does not damage the CNTs and thus results in very little damage to the fiber. In FIG. 4, the 2000-Å fiber with a 0.250 percentage of cross-links is able to support a load out to a strain of 0.181 where the simulation was terminated. In this case, the C—C bonds of the cross-link atoms broke and allowed the CNTs to slip past each other similar to the CNTs held together by van der Waals forces. In fact, it may be possible for the fiber to repair itself by reforming a chemical bond after the fiber has undergone structural rearrangement. On the other hand, the carbon nanotubes tend to fail in fibers with longer CNTs and higher concentrations of cross-links. Having a CNT fail damages the fiber and makes it less likely that it will be able to support the residual stress in the fiber.

To some extent, these simulations represent a nearly ideal fiber configuration, i.e., carbon nanotubes with no defects and a uniform distribution of cross-links. In 2008, Peng et al. reported results for experimental measurements of single shell failure for MWNTs that display fracture strengths of 100 GPa and fracture strains that are very close to theoretical predictions of structures containing only small defects such as vacancies or Stone-Wales defects (see Haskins et al, 2007). Their results demonstrate that cross-linking of carbon nanotubes can yield dramatic increases in sustainable loads far MWNT. A number of experimental and computational results found in the literature elucidate the effects of cross-linking on the elastic properties of SWNT fibers and MWNT (Garg and Sinnott, 1999; Peng et al., 2008; Pregler & Sinnott, 2006; Vodenitcharova et al., 2007; Liu and Qin, 2005; Ni and Sinnott, 2000; Huhtala et al., 2004). Pregler and Sinnott (2006) examined the effects of low-energy electron and ion Ar and $CF_3$ beam irradiation of triple-walled carbon nanotubes to promote cross-linking between shells. The results show that the type and distribution of crosslinks have a significant effect on the load transfer between the carbon nanotubes and, despite the significant cross-linking the carbon nanotubes, for the most part, remain minimally altered by the cross-linking.

These results reported herein demonstrate that interstitial carbon atom cross-links between the carbon nanotubes increases significantly the load transfer between the carbon nanotubes, prevents them from slipping and increasing shear forces between the nanotubes. Such cross-linking would allow a carbon nanotube fiber to be constructed with theoretical strengths, if composed of chiral (5,5) carbon nanotubes, of approximately 60 GPa. The simulations show an increase in she elastic modulus, critical strain, and yield strength with an increase in the average carbon nanotube length and cross-link concentrations. The results also show that over the range of carbon nanotube lengths and cross-link concentrations the dependence of the mechanical properties of the fiber on the average carbon nanotube length is largest for short fibers with low cross-link counts. For fibers with higher cross-link counts the elastic modulus and fiber strength depend on the cross-link count and are far less dependent on the average length of the constituent carbon nanotubes. Values for the elastic modulus and tensile strength of the fibers approach an upper limit for the longer fibers and higher cross-link concentrations. The results also demonstrate that fibers constructed with longer carbon nanotubes achieve maximum tensile strength with lower cross-link concentrations. Taken together, the results suggest that the average number of cross-links per molecule is the controlling factor, with perhaps a smaller effect being the proximity of cross-links within a nanotube causing a slight weakening of the carbon nanotube.

Ultimately, the ability to produce carbon nanotube fibers with a minimum number of defects while optimizing the number and distribution of cross-links will play a major role in determining the properties of carbon nanotube fibers. These results indicate that cross-links between carbon nanotubes promote load transfer while allowing them to retain the majority of their structural integrity. As a result, the fiber retains a substantial portion of the yield strength of the constituent carbon nanotubes.

Experimental Section—Plasma Processing of Carbon Nanotube Yarns and Rovings

The plasma processing experiments in accordance with embodiments of the invention were performed with the goal of producing a strong CNT (carbon nanotube) fiber with an ultimate tensile strength of greater than 1 million PSI (6.7 GPa). Plasma processing was chosen as the processing technique to achieve this in accordance with, embodiments of the invention. Plasma processing can be used on large samples, has a variety of available chemistry and the potential to scale up for industrial production.

The best results obtained in accordance with embodiments of the invention are a specific strength of 0.658 N/tex which, was a 1.5 tex yarn plasma processed with helium gas. This corresponds to a 37% increase in UTS (ultimate tensile strength) over the unprocessed yarn to a value of 0.100 GPa. It was found that thinner yarns produce lower strength increases than thicker yarns. Additionally work was done with twisting and densifying our own yarns using feedstock rovings. The roving shows the most promise in achieving large strength increases.

The following is a brief summary of the terminology used in this patent application:

Fiber—a composite structure made from individual carbon nanotubes

Yarn—a fiber which, is been twisted and densified by acetone to improve its overall strength Roving—an untwisted, undensified fiber that has the appearance of a ribbon Tex—a specific mass measurement defined as a grams per kilometer of fiber UTS—ultimate tensile strength which for brittle materials (such as these) is also very close to the breaking strength Yield Point—the "knee" on a stress/strain curve where a material begins undergoing irreversible necking Modulus—a measurement of the stillness of the material, stress/strain in the linear region up to the yield point Design of Experiments—Three types of fibers were used in the data in this patent application. All fibers were purchased from Nanocomp Technologies, Inc. There are 2 yarns, a 1.5 tex and a 1.2 tex and one roving at 1.2 tex. The roving tex is given such that should it be turned into a yarn, it would produce a 1.2 tex yarn. This product is not commercially sold Nanocomp and was requested specially for this project. Tex is the common way to report specific mass in the fiber and textile industry. Any given fiber can have a variation in diameter by up to 20% for a production run. This translates directly to differences in strength and it is a major reason for the statistical nature of the material failure.

The method of tensile testing is of great importance for fibers. The gage length, which is the length of the fiber between testing clamps, can change the perceived UTS significantly. Likewise, the pull speed has a major influence on testing results. To keep things consistent, all tests were performed at a 1.00±0.01 cm gage length and a pull speed of 1.0 mm/min.

Unfortunately there is no standard method in literature and some publications fail to even report their testing conditions. It is been found that shorter gage lengths and slower pull speeds can inflate tensile strength numbers while longer gage lengths and faster pull speeds have the opposite effect. The method of clamping is likewise important and it often is not reported. Except for the first trial, all tests were made using screw action clamps made by Instron (2710-102) that had rubber faces and were hand tightened. With these grips, fiber slipping was never an issue and jaw brakes were kept to a minimal amount with proper grip alignment.

The fibers were mounted inside the plasma processing chamber in two different ways. For all 1.5 tex fibers, the samples were looped and taped to either a glass slide or a piece of stainless steel shim stock. Because the bottom electrode was grounded, there appeared, to be no appreciable difference between the glass and the stainless when examining the data. For all 1.2 tex fibers, a new sample mount was used that was constructed from stainless steel and Teflon. The fibers were laid across two stainless steel rods and copper alligator clips were used to keep them slightly tensioned and level while they were taped down. This way of mounting put the fibers at a uniform height in the chamber, with a uniform tension and a uniform length plasma processed length.

All data is presented, by specific strength (UTS newtons per tex). This eliminates the need to consider the diameter and density of the fibers and instead the tex value, which is essentially an average material property, is used.

On the graphs, the thick dashed line indicates the control test average while the thin dashed lines represent the positive and negative first standard deviation. There is a line to show the upper five standard deviations. Each circle represents the average of five or more trials (each X is one sample result) and the error bars are the first standard deviation.

Figure 12:
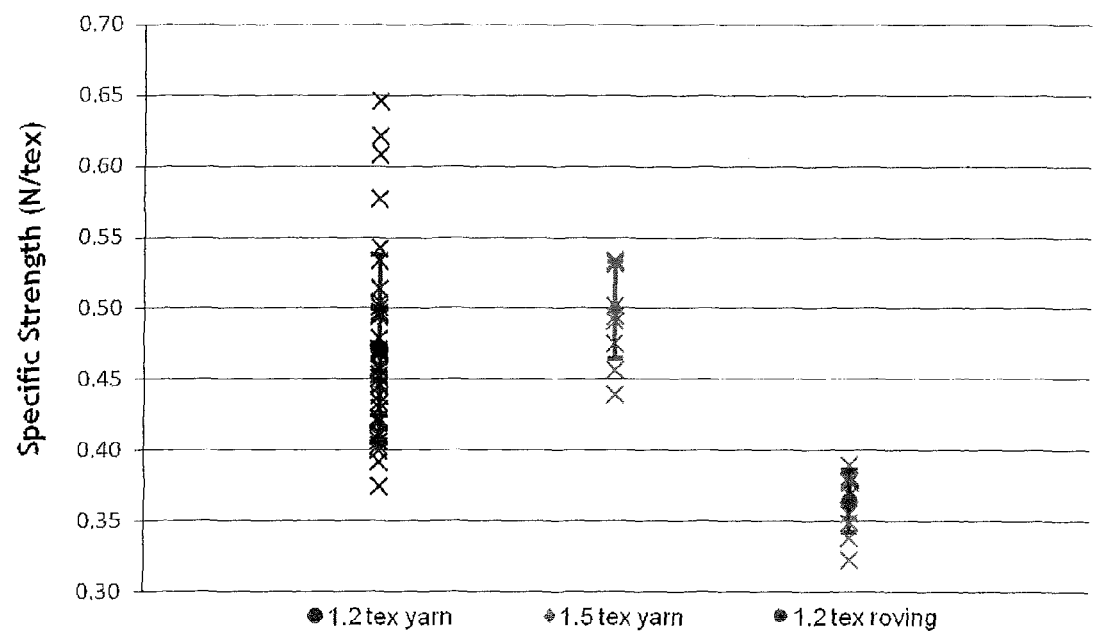
FIG. 12 shows experimental baseline data collected for all types of fibers used in experiments.

Baseline data—In order to determine if our plasma processing and other techniques were having, an effect, an extensive effort was made to collect good baseline data on the unprocessed fibers. FIG. 12 shows the overall baseline data collected for the three types of fibers.

The first fiber to be tested was the 1.5 tex yarn. Ten samples were used at a baseline. The strength as tested by the manufacturer was 0.50 N/tex so the testing value was completely in line with, the manufacturer's method. It should be noted that there was some collaboration done with Nanocomp on the tensile testing technique to make sure that the experimental techniques generated consistent results. It was found by single-blind testing that there was no statistically significant difference between the testing and the manufacturer's testing methods. After the 1.5 tex yarn was completely used up, a 1.2 tex yarn was purchased along with a 1.2 tex roving. Thirty-five tests were performed on the yarn and 10 on the roving. A much larger spread in this data is seen for this yarn, however the roving displays a relatively consistent, albeit lower strength.

Figure 13:
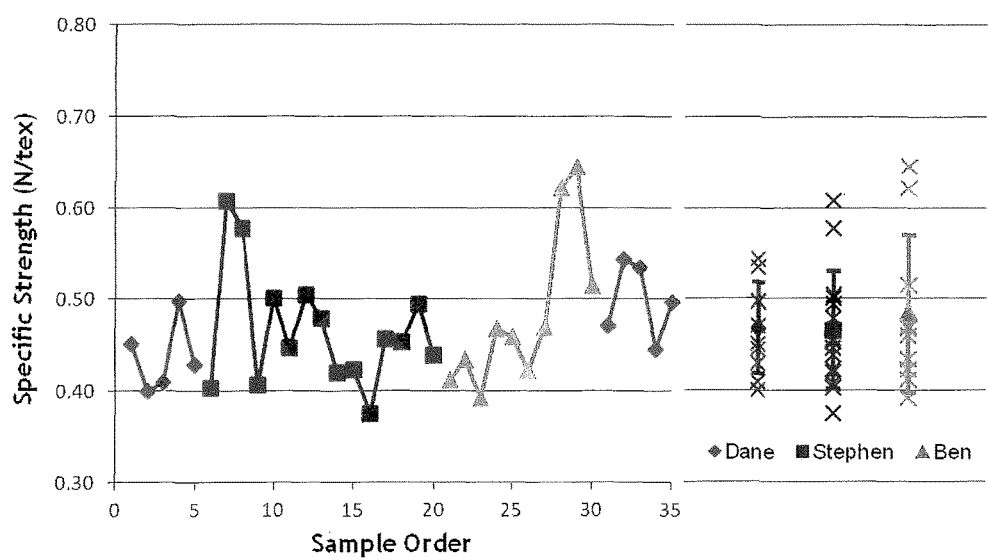
FIG. 13 shows experimental baseline data for 1.2 tex yarn showing little difference between technicians.

It should also be noted that no significant difference between technicians' results while performing the experimental were found. However, there was some correlation in strength related to the order in which the samples were tested. It was found that because of manufacturing inconsistencies along the length of the yarn, higher strength samples were more likely to occur in consecutive tests. This is shown in FIG. 13.

Plasma Processing of CNT Yarns—The starting point for conditions were helium gas, a pressure of 250 milliTorr (mT) and a processing time of 3 minutes. The 1.5 tex yarn was used. The forward plasma power was varied. In this and all further experiments the reflected power was 0 or 1 watt.

Figure 14:
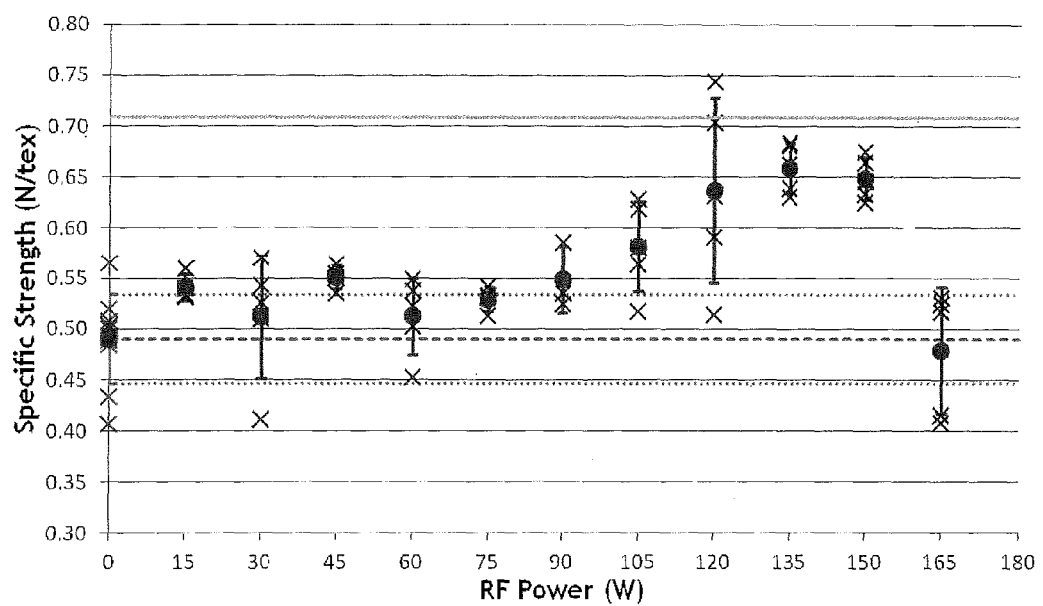
FIG. 14 shows experimental data for helium trend at 250 mT, for 3 minutes, 1.5 tex yarn, o-ring grips.

FIG. 14 shows the trend for the first plasma processing trial performed, it should be noted that the baseline specific strength and standard deviation are slightly different than for all other 1.5 tex yarns. This is because these samples used the baseline data collected with the o-ring grips (not shown in FIG. 12). The average specific strength and standard deviation were found to be very close to the values produced by the screw grips so screw grips were used in all later testing.

Figure 15:
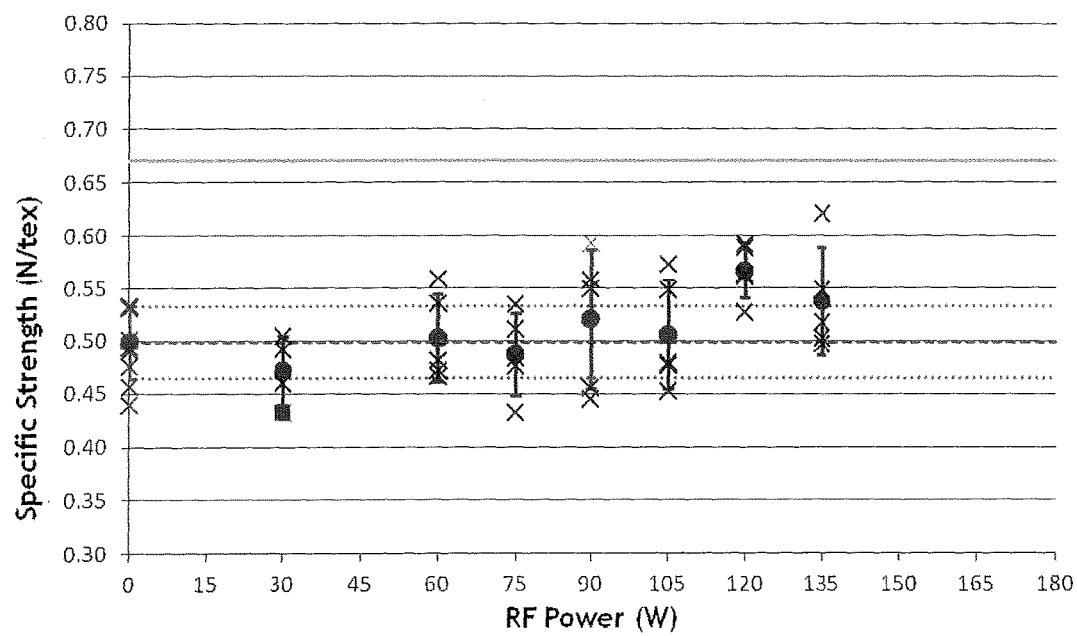
FIG. 15 shows experimental data for helium at 250 mT for 10 minutes, 1.5 tex yarns.

In selected embodiments of the invention, the data show an increase in strength for increase RF power. The average peaks at 133 W with strength increase of approximately 37% in selected embodiments of the invention. The trend for longer processing times however, does not show a similar trend. FIG. 15 shows the same plasma conditions for 10 minutes. There is a lesser increase in strength of about 10 percent.

Figure 16:
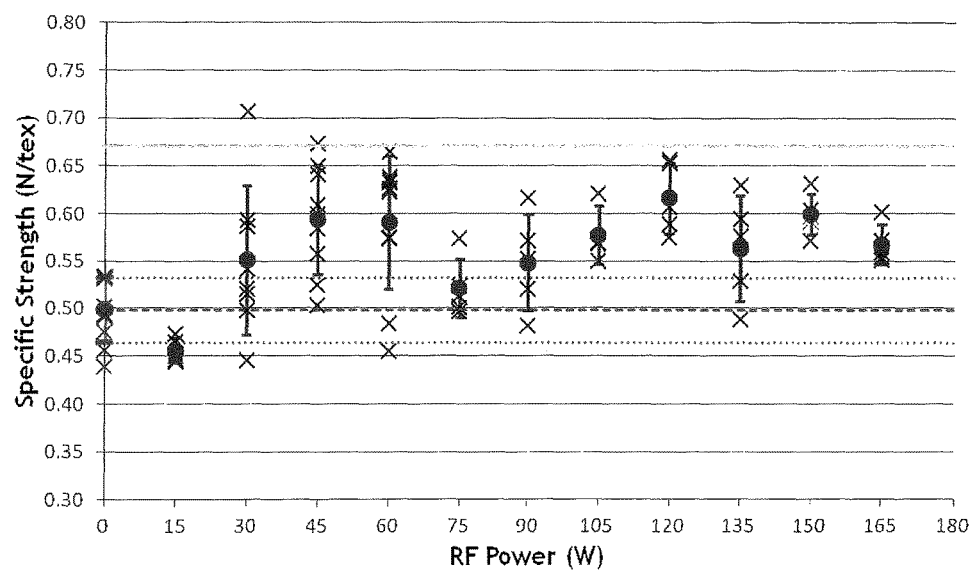
FIG. 16 shows experimental data for argon gas at 135 W RF power, 250 mT pressure for 3 minutes, 1.3 tex yarns.

The next experiment performed was to change the processing gas to argon. It was thought that the larger argon ion might have a larger affect on the change in strength of the yarns. This data is Shown in FIG. 16. As with helium, there is a strength increase for most of die plasma power settings. However now there is a strength increase for the lower power settings as well.

Figure 17:
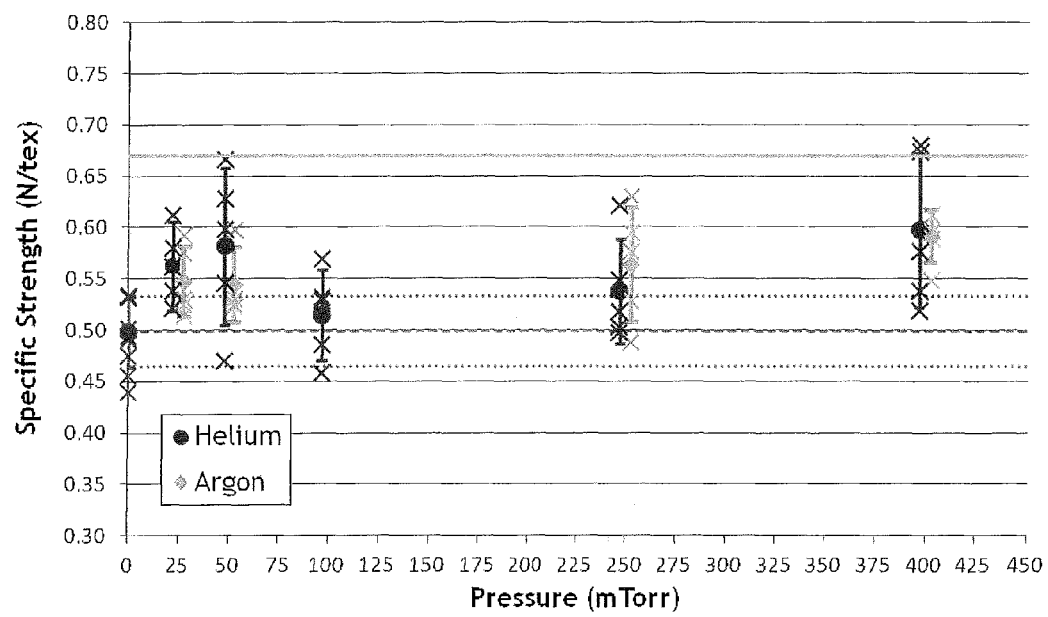
FIG. 17 shows experimental data for argon and helium at 135 W RF power for 3 minutes, 1.5 tex yarns.

Another experiment was performed to explore the effect of the chamber pressure for both argon and helium. FIG. 17 shows that there is not a significant trend between different chamber pressures although, higher pressure did appear to be slightly better.

Figure 18:
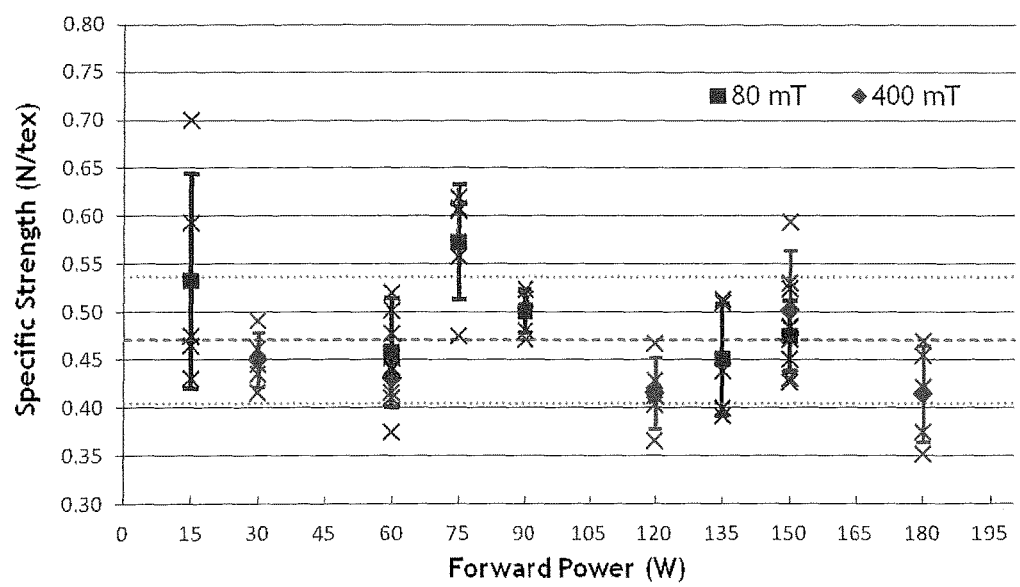
FIG. 18 shows experimental data for RF forward power trial for argon for 3 minutes, 1.2 tex yarns.
Figure 19:
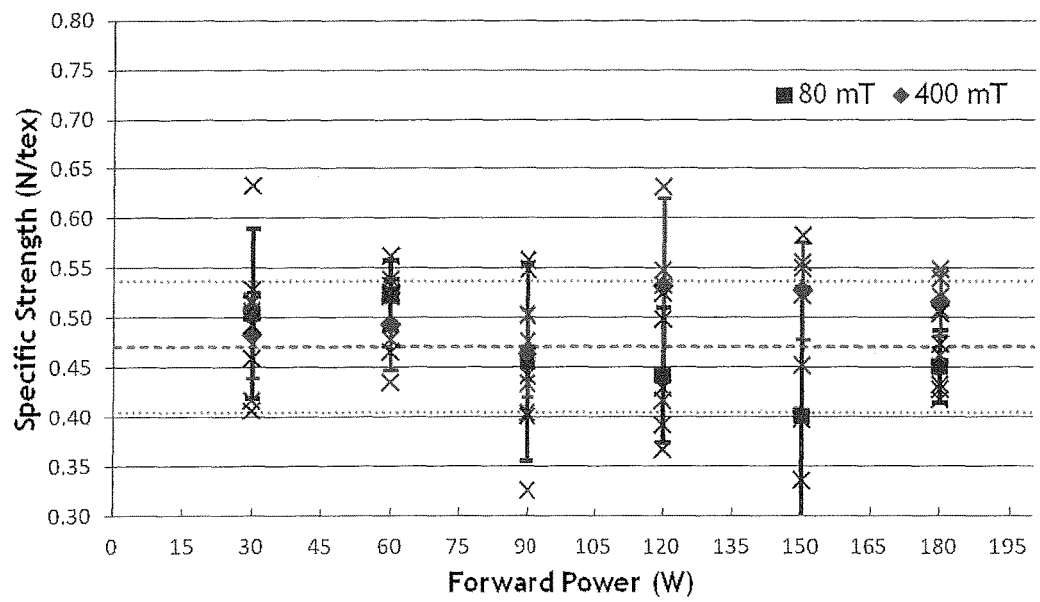
FIG. 19 shows experimental data for RF forward power trial for helium for 3 minutes, 1.2 tex yarns.

FIG. 18 and FIG. 19 show repeated RF forward power trends with the 1.2 tex yarn. With the 1.2 tex yarn there are no discernible trends.

Figure 20:
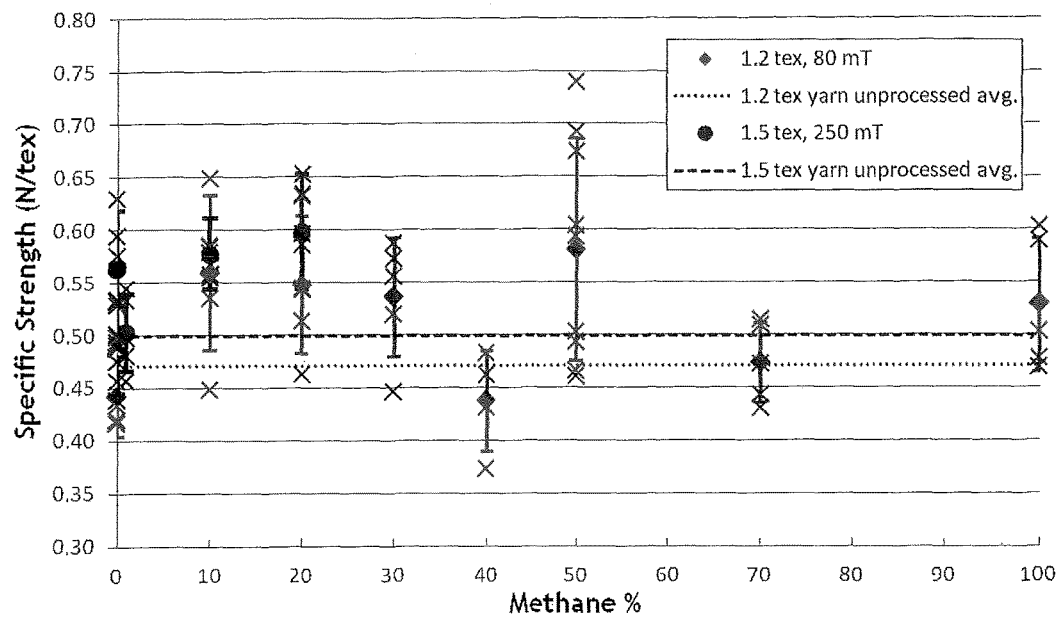
FIG. 20 shows experimental data for methane gas mixed with argon at 135 W for 3 minutes, with two types of yarns tested.

Adding methane to the plasma was tested as shown in FIG. 20. The hypothesis for these experiments was that adding a carbon source to the plasma would provide a feedstock of carbon atoms required to create chemical cross-bonds between individual carbon nanotubes and repair damage to the CNTs caused by plasma ion bombardment. The previous pressure conditions were used and the power was set to 135 W, as was previously shown to produce an increase in specific strength. Some trials produced strength increases whites others were actually weaker. It is believed that this is in part due to the statistical nature of the yarn and how weaker segments are correlated with each other.

Figure 21:
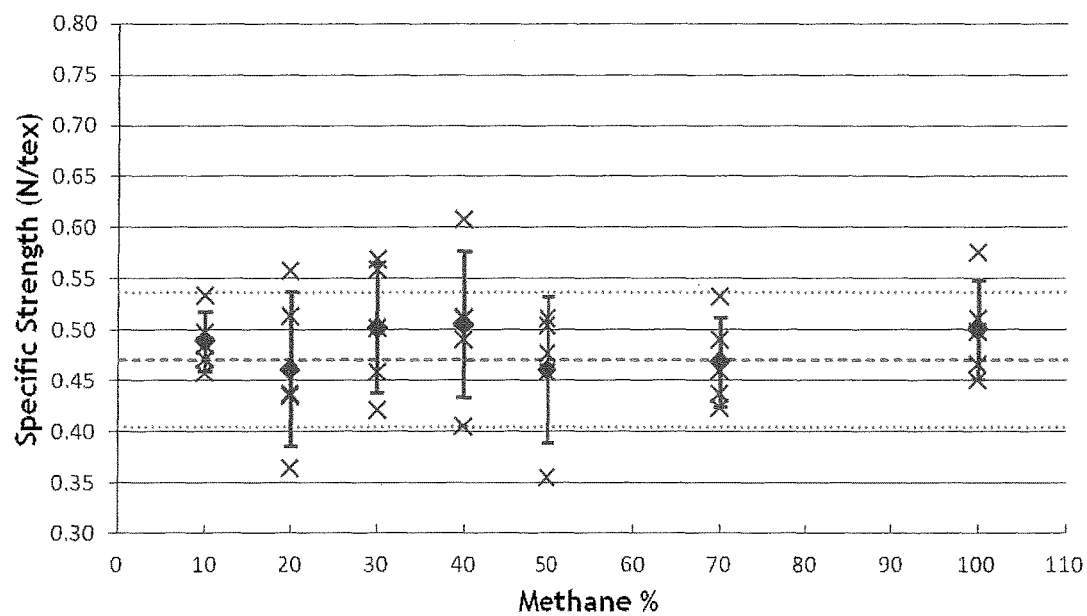
FIG. 21 shows experimental data for methane mixed with helium at 135 W for 3 minutes, 80 mT, 1.2 tex yarn.

An additional experiment was performed to test the effect of varying the methane percentage with helium. This is shown in FIG. 21. In this case there is virtually no difference at any percentage. Apparently helium is less effective as a carrier gas than argon when using methane for plasma processing.

Figure 22:
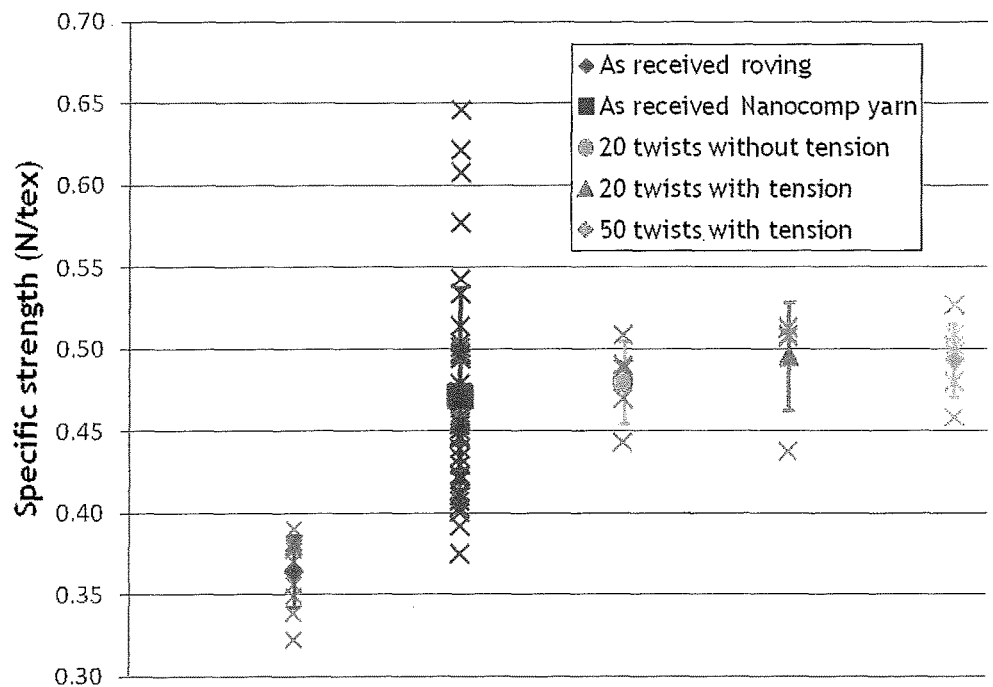
FIG. 22 shows experimental data for CNT rovings under various twisting and densification techniques.

Plasma processing of a CNT roving was performed to test the hypothesis that roving has more potential with plasma processing for strength improvement then the CNT yarn. This theory is based upon the premise that because the roving is art undensified fiber and is very porous whereas the yarn has been twisted and compacted with acetone it therefore is difficult to get the plasma to affect the inner core of the fiber. However, the roving is a much weaker starting material. The yarn gets a portion of its strength from its twist and densification by acetone. This is shown in FIG. 22.

The technique used to density and twist the rovings involved adding a small copper alligator clip to the bottom on a 7 cm long roving with the top secured in the top screw grip of the Instron tensile testing machine. The clip then had the appropriate mass attached to it (equating to a tension equal to the average yield strength of the roving) and the clip was spun a number of times to twist the roving. Once the desire number of twists was achieved, the clip was held to prevent the roving from unwinding and an eyedropper of acetone was gently infused into the fiber. The effect of this is an immediate shrinking of the fiber diameter which is easily visible. This densification also locks in most of the twist, especially at the low twist angles (20 twists). The higher number of twists was found to unwind somewhat when the clip was removed.

Figures 23A, 23B:
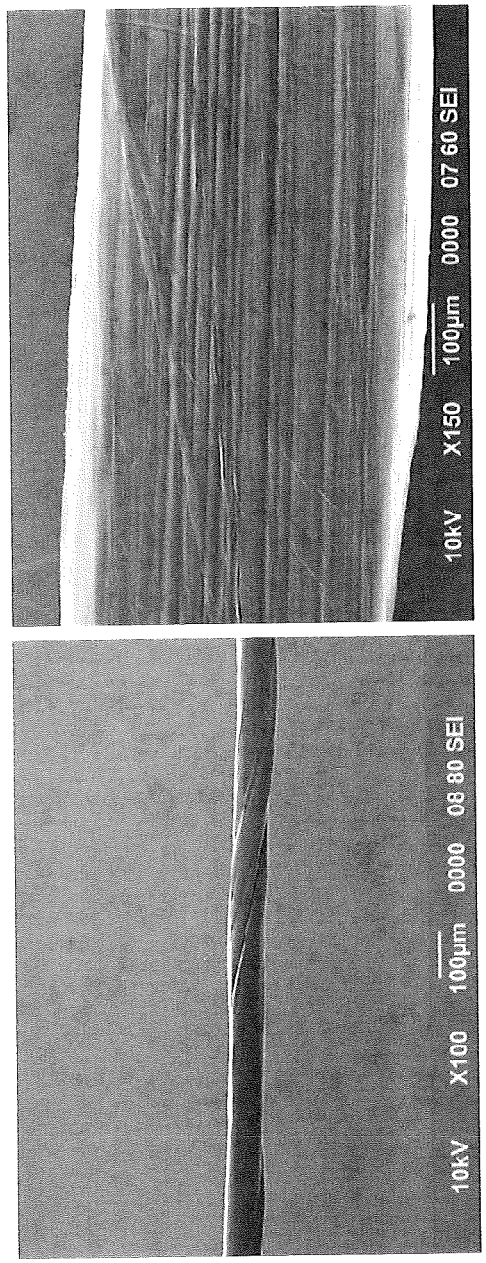
FIGS. 23(A) and 23(b) show SEM images of unbroken fibers, (23(A)) Nanocomp 1.2 tex yarn, (23(B)) 1.2 tex roving.

Scanning electron microscopy images of the yarn and the roving are shown in FIG. 23. The roving is ribbon-like with a wide, flat appearance. The yarn has a more circular cross-section and is much narrower.

Figure 24B:
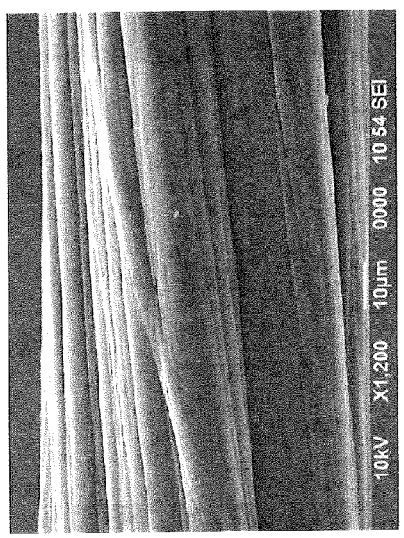
FIGS. 24(a), 24(B) and 24(C) show SEM images of unbroken CNT yarns. (24(A)) 1.2 tex Nanocomp yarn, (24(B)) 1.2 tex roving insisted 20 times and densified by acetone, (24(C) 1.2 tex roving twisted 50 times and densified by acetone.
Figure 24C:
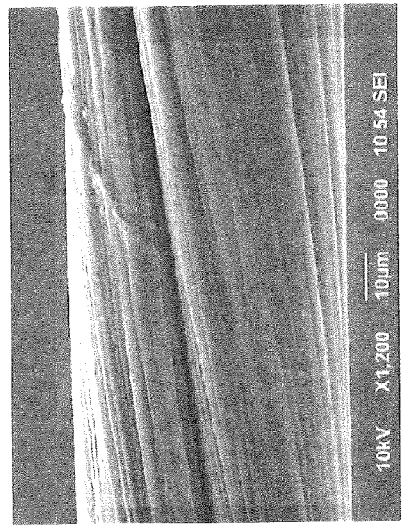
Figure 24A:
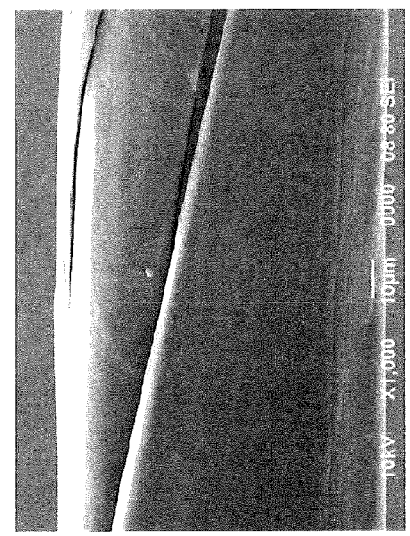
Figure 25:
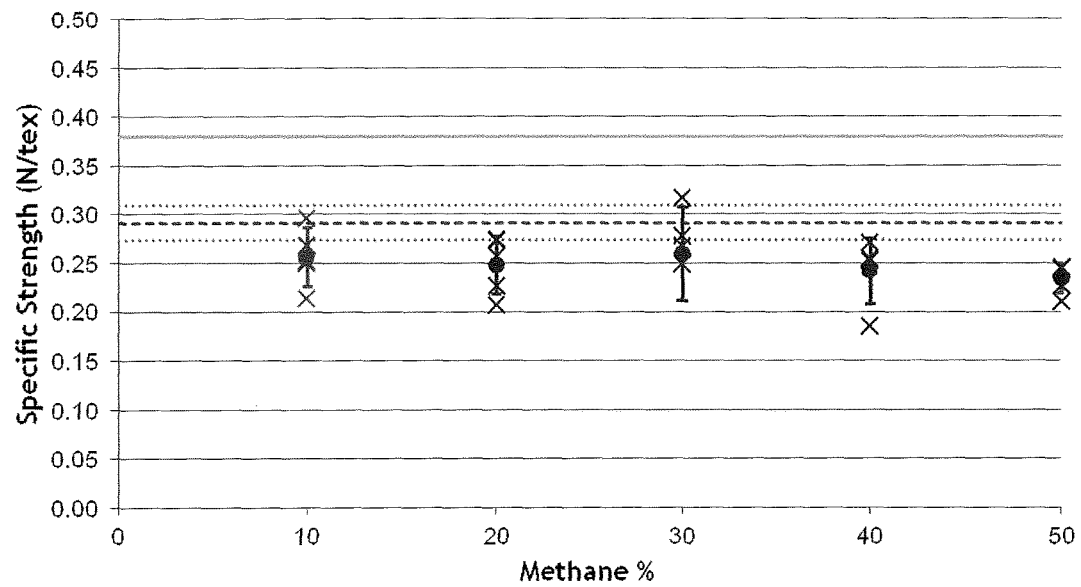
FIG. 25 shows experimental data for plasma processing a roving at 150 W, 400 MT for 3 minutes with a helium carrier gas, with the roving not twisted after processing.

FIG. 24 shows the twist angles for the in-house twisted yarns as well as the Nanocomp yarn. The Nanocomp yarn (top left) has a much smoother surface than either of the twisted and densified rovings. Additionally the twist angle is higher. The number of twists does not equate linearly to the twist angle due to the unknown factor of the fiber unwinding somewhat after the clip is removed. The twist angle of the Nanocomp yarn (top left) was found to be 15+/−0.5 degrees, the wist angle of the 20 twist in-house yarn (top right) was found to be 5.5+/−0.5 degrees, and the twist angle of the 50 twist in-house yarn (bottom) was found to be 8.6+/−0.5 degrees. Fang (2010) describes that the optimal twist angle for MWCNT yarns is about 15 degrees.

Plasma Processing of Rovings—The roving gains most of its strength from the twisting and densification process. The goal of plasma processing the roving is to create cross-bonding such that when the roving is then twisted into a yarn, there are chemical cross-bonding in the internal parts of the yarn as well as on the surface. It was believed that plasma processing the roving without introducing the twist would likely not produce a strength improvement and one performed experiment showed this as a result. The proposed mechanism for this result is that in the roving, the CNTs are spaced quite far apart. The chances therefore of creating a chemical bond on overlapping CNTs is low and most of the energy supplied then to the roving will only produce damage to the individual CNTs and decrease their strength.

It is apparent that the earlier work utilizing the 1.5 tex fibers produced higher strength increases than the later 1.2 tex fiber work. This was seen even for the same conditions on both fibers. Although the exact reason for this is unknown, possible causes are discussed below.

The first potential explanation for the discrepancy is the difference and spread in diameter of the two fibers. The 1.5 tex yarn has a diameter as measured in the SEM of 65 μm+/−5 μm. However, the 1.2 tex yarn has a diameter of 56 μm+/−10 μm.

$$\text{density} = \frac{\text{mass}}{\text{volume}} \rightarrow \text{density ratio} = \frac{\frac{tex}{\pi r^2 l}}{\frac{tex}{\pi r^2 l}} = \frac{\frac{1.5 \text{ g/km}}{\pi (65 \text{ μm})^2 \cdot 1 \text{ km}}}{\frac{1.2 \text{ g/km}}{\pi (56 \text{ μm})^2 \cdot 1 \text{ km}}} = \frac{1.5 \times 56^2}{1.2 \times 65^2} = 0.92$$

The above equation shows that the 1.5 tex yarn is actually less dense that the 1.2 tex yarn on average. Therefore it is believed that it is easier for plasma to penetrate the 1.5 tex yarn than the 1.2 tex yarn. It would then be a possible mechanism that the processing done to the 1.2 tex yarn might only be affecting the outer layer of the fiber.

Another possible cause for the increased strength of the 1.5 tex yarns also relates to the increased diameter. Because the hypothesis is that most of the plasma processing on these dense fibers occurs only on the surface, the increased surface area of the larger diameter fiber would mean that any beneficial effects caused by plasma processing would occur on a larger surface area per unit length of the fiber.

Under this theory and/or mechanism, the roving could possibly have the highest strength increases from plasma treatment. The awing shows a high potential to benefit from plasma processing. The open fiber allows one to make changes to the entire surface since it is effectively a two-dimensional plane, and then twisting and/or densifying techniques can be used to create a strong yarn.

A carbon source in the plasma results in higher strength increases than just a noble gas as has been partially demonstrated in FIG. 20. The proposed mechanism is that carbon ions can repair the damage caused by ion bombardment from the carrier gas and/or provide additional carbon atoms for interstitial carbon bonding between carbon nanotubes in the fiber.

Many hundreds of stress-strain curves have been collected for the broken fibers. Thus far the focus has been on improving the UTS only. It is believed that other properties such as modulus, fracture toughness and yield point may be positively impacted by plasma processing.

Embodiments of the invention are set forth in the appended, non-limiting, claims.

What is claimed is:

1. A method of making a plasma-treated fiber comprising individual carbon nanotubes having a tensile strength improvement, relative to a tensile strength of said fiber prior to said plasma treatment, comprising the steps of (a) obtaining a fiber comprising individual carbon nanotubes, and (b) treating said fiber with a plasma to obtain a plasma-treated fiber comprising individual carbon nanotubes having a tensile strength improvement of at least 10%, relative to a tensile strength of said fiber prior to said plasma treatment.

2. The method of claim 1 wherein said tensile strength improvement is at least 20%.

3. The method of claim 1 wherein said tensile strength improvement is at least 35%.

4. The method of claim 3 wherein said tensile strength is at least 0.65 N/tex.

5. The method of claim 1 wherein said plasma is selected from the group consisting of helium and argon plasma.

6. The method of claim 1 wherein said plasma is a pressurized plasma.

7. The method of claim 1 wherein said plasma treatment forms carbon bonds between the individual carbon nanotubes in the fiber.

8. The method of claim 1 wherein said plasma further comprises a carbon source; and wherein said plasma treatment forms carbon bonds between the individual carbon nanotubes in the fiber.

9. The method of claim 1 wherein said carbon source is methane.

10. The method of claim 1 wherein said fiber has been twisted, and densified with a solvent prior to plasma treatment.

11. The method of claim 1 wherein said fiber has a specific mass measurement, prior to plasma treatment, of 1.5 grams per kilometer of fiber.

12. The method of claim 1 wherein said plasma treatment occurs at a power greater than 130 watts.

* * * * *